United States Patent [19]

Bentz et al.

[11] Patent Number: 5,354,625
[45] Date of Patent: Oct. 11, 1994

[54] METAL-AIR POWER SUPPLY AND AIR-MANAGER SYSTEM, AND METAL-AIR CELL FOR USE THEREIN

[75] Inventors: R. Dennis Bentz; Christopher S. Pedicini; William J. Scott, Jr., all of Marietta, Ga.

[73] Assignee: AER Energy Resources, Inc., Atlanta, Ga.

[21] Appl. No.: 852,001

[22] Filed: Mar. 16, 1992

[51] Int. Cl.⁵ .................................. H01M 8/04
[52] U.S. Cl. .................................. 429/17; 429/22; 429/26
[58] Field of Search .............. 429/17, 26, 22, 27, 429/29

[56] References Cited

U.S. PATENT DOCUMENTS

| | | |
|---|---|---|
| 684,700 | 10/1901 | Lloyd . |
| 737,613 | 9/1903 | Halsey . |
| 1,112,861 | 10/1914 | Snyder . |
| 1,285,659 | 11/1918 | Ford . |
| 1,363,889 | 12/1920 | Linebarger . |
| 2,273,244 | 2/1942 | Ambruster . |
| 2,907,809 | 10/1959 | Southworth et al. . |
| 3,160,528 | 12/1964 | Dengler et al. . |
| 3,288,644 | 11/1966 | Delfino . |
| 3,395,047 | 7/1968 | Terry et al. . |
| 3,473,963 | 10/1969 | Sanderson . |
| 3,518,123 | 6/1970 | Katsoulis et al. . |
| 3,523,830 | 8/1970 | Baker et al. ............ 429/22 |
| 3,840,404 | 10/1974 | Porter et al. . |
| 3,855,000 | 12/1974 | Jammet . |
| 4,063,007 | 12/1977 | Spiegelberg . |
| 4,118,544 | 10/1978 | Przybyla et al. . |
| 4,177,327 | 12/1979 | Mathews et al. . |
| 4,189,526 | 2/1980 | Cretzmeyer et al. . |
| 4,221,644 | 9/1980 | Terry et al. . |
| 4,262,062 | 4/1981 | Zatsky . |
| 4,279,970 | 7/1981 | Breault et al. . |
| 4,490,443 | 12/1984 | Ruch et al. . |
| 4,493,880 | 1/1985 | Lund . |
| 4,588,660 | 5/1986 | Shimizu et al. . |
| 4,588,661 | 5/1986 | Kaufman et al. . |
| 4,620,111 | 10/1986 | McArthur et al. . |
| 4,693,946 | 9/1987 | Niksa et al. . |
| 4,738,905 | 4/1988 | Collins . |
| 4,765,980 | 7/1988 | Niksa et al. . |
| 4,828,939 | 5/1989 | Turley et al. . |
| 4,857,885 | 8/1989 | Umerez . |
| 4,871,627 | 10/1989 | Strong et al. . |
| 4,894,295 | 1/1990 | Cheiky . |
| 4,913,983 | 4/1990 | Cheiky . |
| 4,950,561 | 8/1990 | Niksa et al. . |
| 4,957,826 | 9/1990 | Cheiky . |

FOREIGN PATENT DOCUMENTS

| | | |
|---|---|---|
| 0265242 | 4/1988 | European Pat. Off. . |
| 0417324 | 3/1991 | European Pat. Off. . |
| 3239396 | 4/1984 | Fed. Rep. of Germany . |

Primary Examiner—Olik Chaudhuri
Assistant Examiner—C. Everhart
Attorney, Agent, or Firm—Jones & Askew

[57] ABSTRACT

A metal-air power supply which provides improved control over air flow is provided. The reactant air and cooling air inlets are separate from one another and isolated from the exhausted reactant and cooling portions of the air flow. The reactant air flow is limited to a volumetric flow rate sufficient to provide from about 3 to about 10 times the stoichiometric amount of oxygen necessary to produce a predetermined level of current from the cell, and a total volumetric flow rate of air sufficient so that the cooling portion of the air flow has a volumetric flow rate from about 10 to about 1000 times the volumetric flow rate of the reactant portion of the air flow is provided. This limits the flow rate of the reactant air over the cathode, isolates the cooling air flow from the reactant air flow, and maintains the temperature of the metal-air cell at a low level without exposing the air cathode to an excessive air flow rate to reduce the likelihood of drying out the metal-air cells, reduce the exposure of the battery cell to contaminants, and minimize the effects of temperature on the vaporization of water within the cell. In a preferred embodiment, the power supply housing and the metal-air cell case form part of the air plenums. A substantially leak-proof metal-air cell is also disclosed.

33 Claims, 19 Drawing Sheets

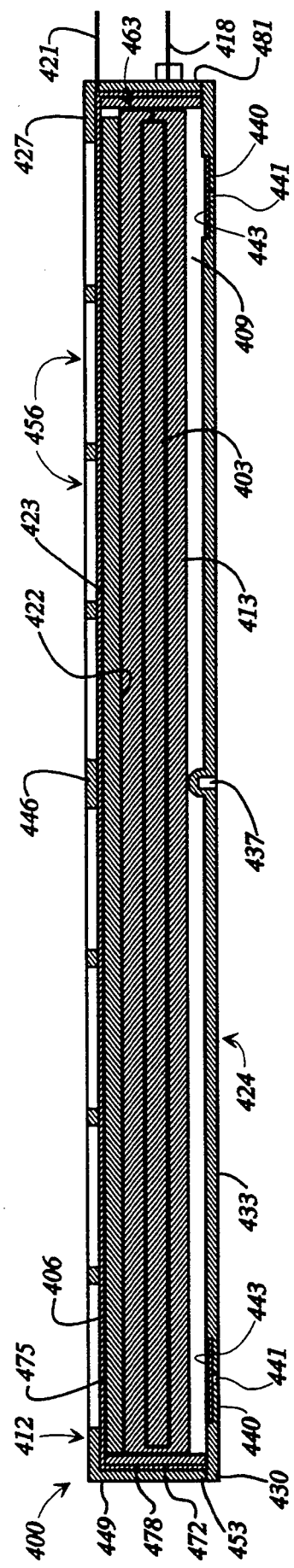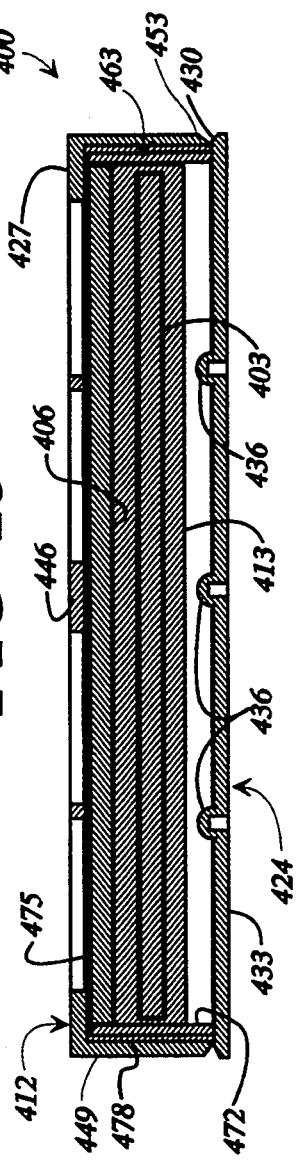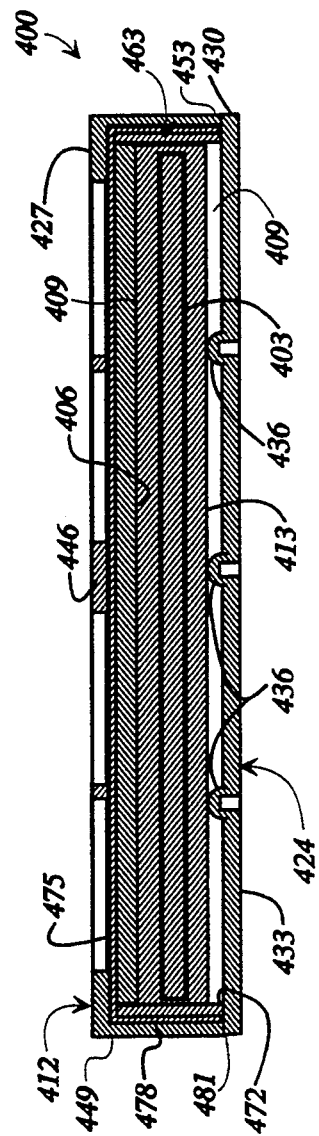
FIG 13
FIG 11
FIG 12

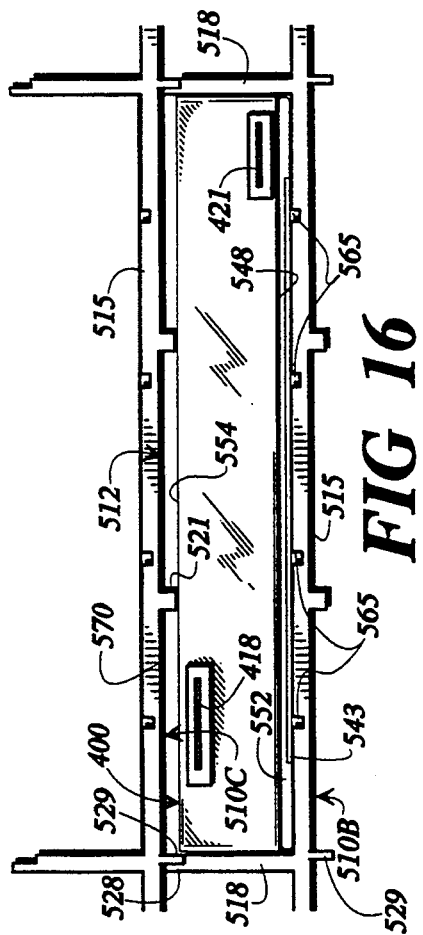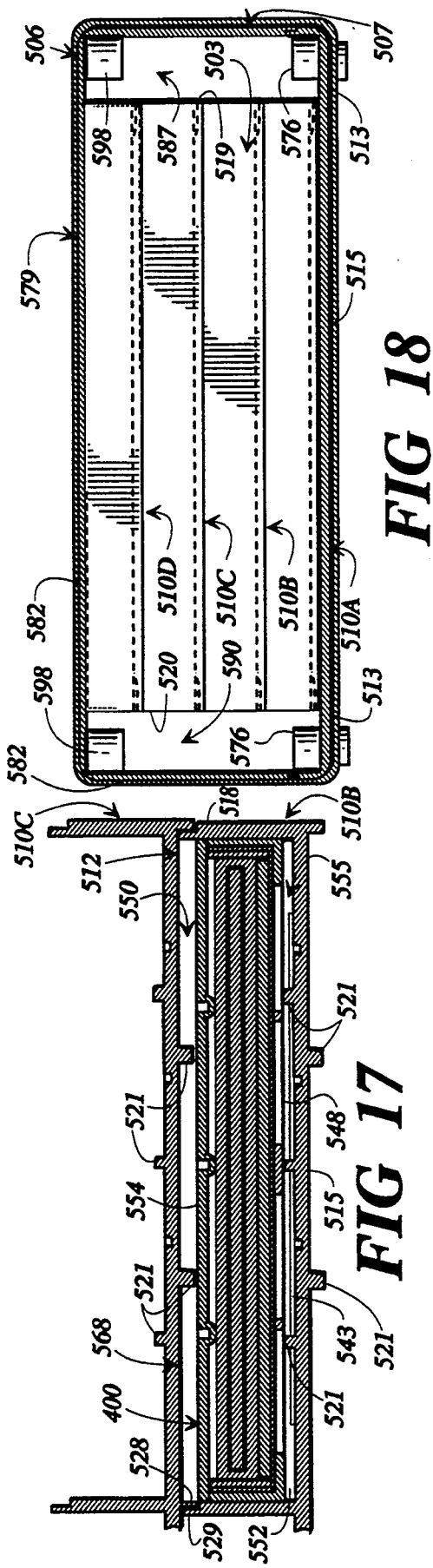

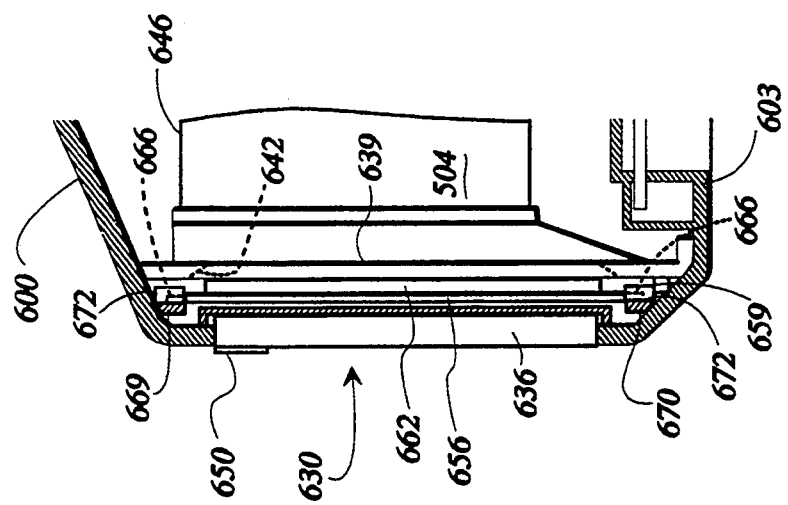
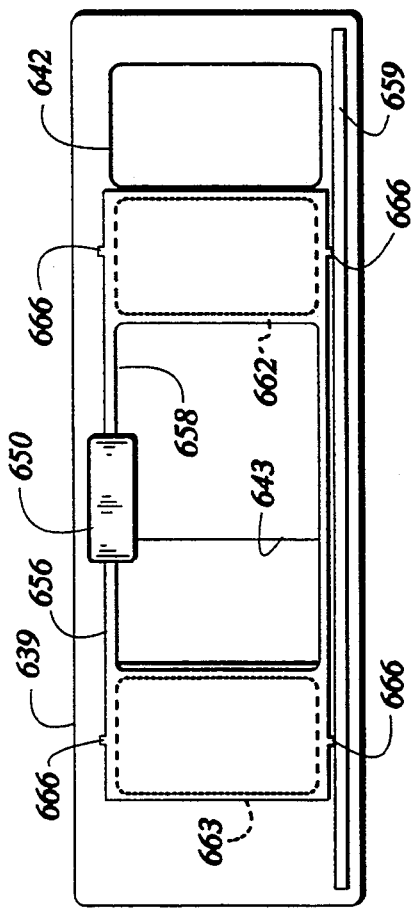
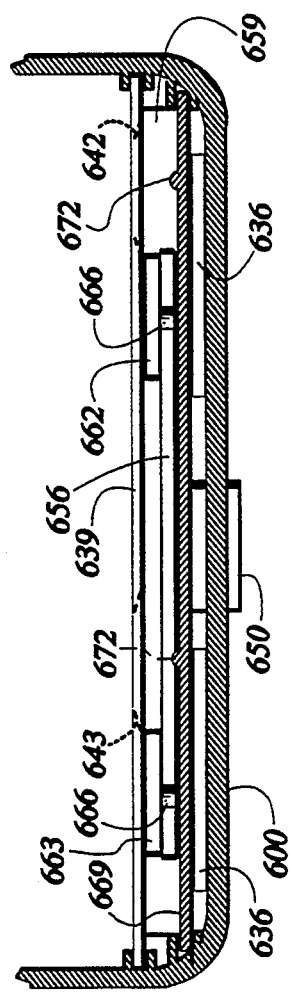

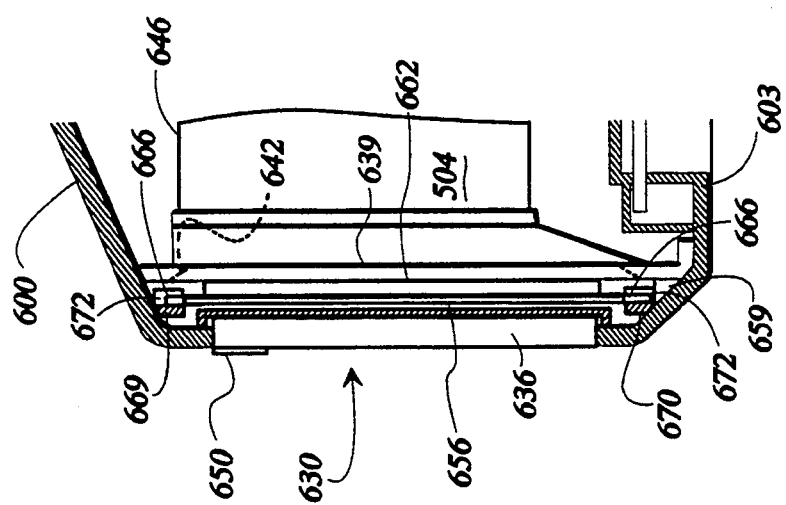
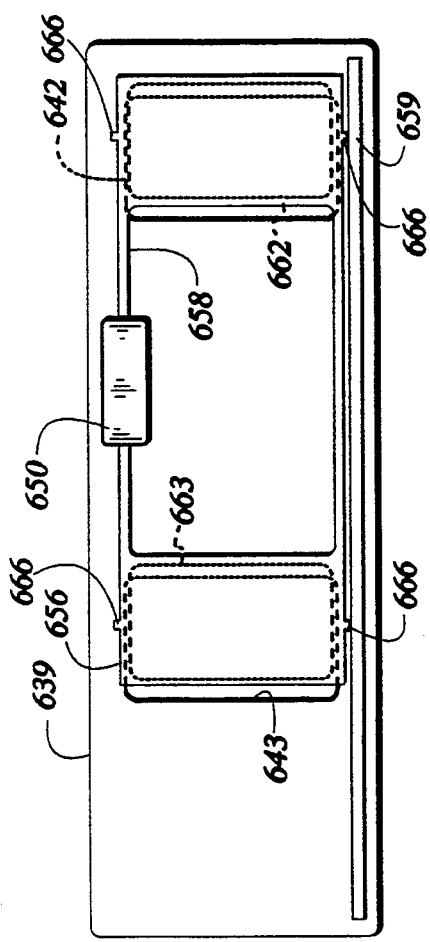
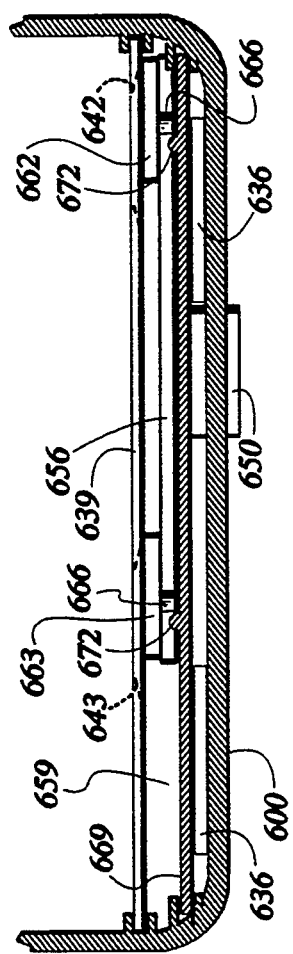

METAL-AIR POWER SUPPLY AND AIR-MANAGER SYSTEM, AND METAL-AIR CELL FOR USE THEREIN

TECHNICAL FIELD

This invention relates to electrochemical cells, and more particularly to metal-air electrochemical cells.

BACKGROUND OF THE INVENTION

There is an increasing need for light-weight, high-output power supplies for powering the increasing supply of portable electronic equipment such as personal computers. Electrochemical cells are commonly used as power supplies for a variety of applications but are often impractical for use with portable electronic equipment because the electrical energy densities of the electrochemical cells are too low. In other words, conventional electrochemical cells that produce the desired power output are often too heavy for use with portable equipment.

One electrochemical cell that is an exception is the metal-air cell. Metal-air cells have a relatively high energy density because the cathode of a metal-air cell utilizes oxygen from ambient air as a reactant in the electrochemical reaction rather than a heavier material such as a metal or metallic composition. This results in a relatively light-weight power supply.

Metal-air cells include an air permeable cathode and a metallic anode surrounded by an aqueous electrolyte. For example, in a zinc-air cell, the anode contains zinc, and during operation, oxygen from the ambient air is converted at the cathode to hydroxide, zinc is oxidized at the anode by the hydroxide, and water and electrons are released to provide electrical energy.

Cells that are useful for only a single discharge cycle are called primary cells, and cells that are rechargeable and useful for multiple discharge cycles are called secondary cells. Both primary and secondary metal-air cells have been developed. An electrically rechargeable metal-air cell is recharged by applying voltage between the anode and cathode of the cell and reversing the electrochemical reaction. Oxygen is discharged to the atmosphere through the air permeable cathode.

Metal-air cells are often arranged in multiple cell battery packs to provide a sufficient amount of power output. In addition, it is often necessary to expose the air cathodes of the cells to a continuous flow of air at a flow rate sufficient to achieve the desired power output. Such an arrangement is shown in U.S. Pat. No. 4,913,983 wherein a fan is used to supply a flow of air to a pack of metal-air battery cells.

One problem with metal-air cells is that the ambient humidity can cause the metal-air cell to fail. Equilibrium vapor pressure of the metal-air cell results in an equilibrium relative humidity that is typically about 45 percent. If ambient humidity is greater than the equilibrium relative humidity value for the metal-air cell, the metal-air cell will absorb water from the air through the cathode and fail due to a condition called flooding. Flooding may cause the cell to leak. If the ambient humidity is less than the equilibrium relative humidity value for the metal-air cell, the cell will release water vapor from the electrolyte through the air cathode and fail due to drying out. In most environments where a metal-air battery cell is used, failure occurs from drying out.

During operation of a metal-air cell, the electrolytic reaction produces heat and increases the temperature of the cell. The heat produced by the electrolytic reaction increases the rate of vaporization of the water contained in the cell. The air flow rate over the air cathode may be increased to cool the metal-air cell as is disclosed in U.S. Pat. No. 3,395,047; however, the increase in the air flow rate over the air cathodes increases the rate of vaporization of the water and offsets the decrease in water loss from the cooling effect.

In some conventional arrangements such as that shown in U.S. Pat. No. 4,913,983, metal-air cells are arranged inside a housing and air is circulated within the housing and around the cells. The same air circulating within the housing is used for cooling the cells and for reactant air. Although the air cools the cells to some extent, the air circulating within the housing is heated by the cells and then passes through the cells and over the cathode as reactant air. The mixing of cooling air and reactant air entering the cells increases the rate of vaporization of the water in the cells and offsets the decrease in water loss from the cooling effect.

Another problem with a metal-air battery is that contaminates in the air such as carbon dioxide, smoke, and sulfides, decrease the battery output. For example, carbon dioxide reacts with the metal hydroxide in the electrolyte. The reaction between carbon dioxide and the metal hydroxide forms a metal carbonate compound that interferes with the electrochemical reaction. The exposure of metal-air battery cells to contaminates is increased if the air flow rate over the cathodes is increased for cooling.

Drying out and flooding are even greater problems for secondary metal-air cells than for primary metal-air cells. Although ambient humidity may not be a sufficient problem to flood or dry out a cell after a single cycle, cumulative water gain or loss from a series of discharge and charge cycles can cause premature failure of a secondary metal-air cell.

Another problem with metal-air cells is electrolyte leakage which causes cell failure and corrosion of the cell surroundings. As set forth above, a metal air cell includes an air cathode, an anode, and electrolyte between the cathode and anode. In a typical metal-air cell, these components are encased between frames of a cell case. The case frames may be mechanically fastened with bolts or the like, fastened with adhesive, or welded together. In each instance, the cell case includes one or more seams through which electrolyte may eventually leak. Moreover, steps taken to ensure that the seams of a metal-air cell are liquid impermeable are often time consuming and costly.

Electrolyte also may leak through or around the air cathode. It is known to cover the air side of a cathode with a liquid impermeable but gas permeable film to control electrolyte leakage. However, leaked electrolyte can form bulges beneath such a film and block or otherwise inhibit the flow of air over the cathode, or leak around the periphery of the film.

Yet another problem encountered with metal-air cells occurs when metal-air cells are arranged within an air manager housing and especially when metal-air cells are arranged in battery packs. Metal-air cells must be arranged in an air-manager so that an appropriate stoichiometric amount of air flows relatively unobstructed over the air cathode. Preferably, air for cooling also flows adjacent the cell. The passageway for air over an air cathode is typically formed by an integral part of the cell case. When a multi-cell battery pack is formed, the cells are normally fastened together by mechanical means, adhesive or welding. The formation of metal-air cell cases, battery packs, and the associated air flow passageways with such methods is complex, time consuming and costly.

Accordingly, there is a need for a metal-air power supply with an air-manager system that provides greater control over air flow through the power supply and thereby minimizes the effect of ambient humidity and contaminates on the useable life of the power supply. In addition, there is a need for such a metal-air power supply that is not likely to leak and is relatively simple in construction and inexpensive.

SUMMARY OF THE INVENTION

According to one aspect of the present invention, a metal-air power supply which provides improved control over air flow through the power supply is provided. The power supply of the present invention includes a metal-air cell disposed in a housing. The metal-air cell includes an air cathode. The power supply includes an air manager which produces a flow of air through the housing and directs a reactant portion of the air flow through a reactant air inlet to the air cathode of the cell and exhausts the reactant portion of the air flow from the cell. The air manager also directs a cooling portion of the air flow through a cooling air inlet to a portion of the cell isolated from the air cathode and exhausts the cooling portion of the air flow from the housing. The reactant air inlet and the cooling air inlet are separate from one another and isolated from the exhausted reactant and cooling portions of the air flow. The air manager limits the reactant air flow to a volumetric flow rate sufficient to provide from about 3 to about 10 times the stoichiometric amount of oxygen necessary to produce a predetermined level of current from the cell and produces a total volumetric flow rate sufficient so that the cooling portion of the air flow has a volumetric flow rate from about 10 to about 1000 times the volumetric flow rate of the reactant portion of the air flow. By limiting the flow rate of the reactant air over the air cathode, isolating the cooling air flow from the reactant air flow, and maintaining the cooling air flow rate at a sufficient level, the temperature of the metal-air cell can be kept low without exposing the air cathode to an excessive air flow rate. This minimizes the loss of water vapor from the cell, reduces the exposure of the battery cell to contaminants, and thus, maximizes the useful life of the cell.

Preferably, the volumetric flow rate of the reactant portion of the air flow through the power supply is limited by a barrier having an orifice through which the reactant portion of the air flow passes. The orifice is sized so as to limit the volumetric flow rate of the reactant portion of the air flow to an acceptable level.

In addition, to eliminate drying out or flooding of the cell while the cell is not discharging, the power supply preferably includes a device for selectively exposing the air cathode of the cell to the reactant portion of the air flow while the power supply is powering a load, and alternatively, isolating the air cathode from the reactant portion of the air flow during periods of nonuse of the power supply.

According to another preferred embodiment of the present invention, a metal-air power supply which provides improved control over air flow through the power supply is provided. This power supply includes a metal-air cell having an air cathode disposed in a cell case. The metal-air cell is disposed within a housing, and the power supply includes a device for producing a flow of air through the housing. The power supply forms a cathode plenum adjacent the air cathode and forms a cathode plenum inlet and a cathode plenum outlet along one end of the metal-air cell. The power supply also forms a reactant air inlet plenum adjacent the one end of the metal-air cell for directing a reactant portion of the air flow through the cathode plenum inlet into the cathode plenum. In addition, the power supply forms a reactant air outlet plenum adjacent the reactant air inlet plenum so that the reactant air inlet plenum is between the reactant air outlet plenum and the metal-air cell. Further, the power supply defines a discrete path for directing the reactant portion of the air flow from the cathode plenum, through the cathode plenum outlet, across the reactant air inlet plenum, and into the reactant air outlet plenum, whereby the reactant portion of the air flow exits the cathode plenum without mixing with the first portion of the air flow entering the cathode plenum.

By controlling the flow of reactant air through the housing and metal-air cell, the power supply of the present invention uses a minimal amount of reactant air. The reactant air flow is controlled by preventing mixing of the air flow entering the cathode plenum with the spent air flow exiting the cathode plenum. Without exposing the air cathode to an excessive air flow rate, the power supply of the present invention reduces the likelihood that the metal-air cell will dry out and reduces the exposure of the metal-air cell to contaminants. This provides for an improved usable life of the power supply.

Preferably, this embodiment of the power supply of the present invention directs a cooling portion of the air flow adjacent a portion of the metal-air cell case isolated from the cathode for cooling the cell. More preferably, the metal-air power supply of the present invention forms an air intake plenum adjacent the cell for receiving the air which flows through the housing. The reactant air inlet plenum extends from the air intake plenum and receives the reactant portion of the air flow from the intake plenum. Also preferably, the cooling portion of the air flow is directed from the intake plenum along a path adjacent a portion of the cell isolated from the cathode, and out of the housing, whereby the cooling portion of the air flow does not contact the air cathode. By avoiding contact of the cooling portion of the air flow which cools the cell from the air cathode, the likelihood of the metal-air cell drying out is reduced.

Still more preferably, the power supply of the present invention includes a reactant air plenum inlet opening for receiving the reactant portion of the air flow and a reactant air outlet plenum outlet opening for discharging the reactant portion of the air flow. In addition, the power supply of the present invention preferably includes a door for closing both the reactant air inlet plenum inlet opening and the reactant air outlet plenum outlet opening, the door being selectively movable to one position wherein the reactant air inlet plenum inlet opening and the reactant air outlet plenum outlet opening are opened and, alternatively, being movable to another position wherein the reactant air inlet plenum inlet opening and the reactant air plenum outlet opening are closed. Advantageously, the reactant air inlet plenum inlet opening and the reactant air outlet plenum outlet opening may be substantially aligned with one another so that the door may include a plate which fits over the openings. In addition, the door preferably includes a piece for guiding the first portion of the air flow from the intake plenum into the reactant air inlet plenum. This guiding means may be a U-shaped member extending from a cover plate at least partially into the reactant air inlet plenum through the reactant air inlet plenum inlet opening.

Yet another embodiment of the power supply of the present invention comprises a metal-air cell which includes a case and an air cathode disposed in the case, the air cathode being at least partially exposed through one side of the case. This power supply forms a cathode plenum adjacent the air cathode, the cathode plenum extending from a reactant air inlet opening proximate one end of the case to a reactant air outlet proximate an opposite end of the case. In addition, this power supply of the present invention forms a cooling air plenum adjacent a side of the cell case opposite the one side of the cell case, the cooling air plenum being discrete from the reactant air plenum and extending from a cooling air inlet proximate the one end of the case to a cooling air outlet proximate the opposite end of the case.

In this embodiment the power supply also includes a housing which forms: a cell compartment in which the metal-air cell is disposed; an air intake plenum adjacent the one end of the case, the air intake plenum having an air intake opening and surrounding the reactant air and cooling air inlets so as to isolate the reactant air and cooling air inlets from the reactant air and cooling air outlets; and an air exhaust plenum adjacent the opposite end of the cell case and discrete from the air intake plenum, the air exhaust plenum having an air exhaust opening and surrounding the reactant air and cooling air exits. Further, this embodiment of the present invention includes a device for producing a flow of air which flows from the air intake opening through the air intake plenum, separates into a reactant air flow which flows through the cathode plenum from the reactant air inlet to the reactant air outlet and a cooling air flow which flows through the cooling air plenum from the cooling air inlet to the cooling air outlet, recombines into a single flow of air in the air exhaust plenum, and then flows through the air exhaust plenum and outside the housing through the air exhaust opening. Still further, this embodiment of the present invention includes a device for selectively opening the air intake and air exhaust openings to expose the air cathode to the flow of air, and, alternatively, closing the air intake and air exhaust openings to isolate the air cathode from the air outside the housing.

Preferably, this power supply of the present invention forms a compartment for receiving the metal air cell and registers the cell within the compartment so that when the cell is received within the compartment, the cell and the power supply form the cathode plenum and the cooling air plenum. The compartment is preferably formed by partitions spaced from one another to receive the cell case therebetween and first and second panels which extend between the partitions. The first panel forms at least a portion of the cathode plenum, and the second panel which is spaced from the first panel forms at least a portion of the cooling air plenum. In addition, a plurality of spaced ribs protruding from the first panel spaces the cell case and air cathode from the first panel, and a plurality of spaced ribs protruding from the second panel spaces the cell case from the second panel.

According to another embodiment of the power supply of the present invention, a power supply includes a plurality of stackable trays for holding a plurality of metal-air cells. The trays are stacked one upon the other to form an array of compartments for receiving the metal-air cells. In addition, the stackable tray registers the cell within the formed component so that the cell cases and the trays form a cathode plenum in each compartment adjacent the respective air cathode and a cooling air plenum isolated from the air cathode, whereby reactant air may be directed against the air cathodes and cooling air may be directed against a portion of each cell case isolated from the respective air cathode.

The stackable tray of the present invention preferably includes partitions spaced from one another and a panel extending between the partitions. The cell cases are disposed between adjacent partitions so that the panels of the trays form at least a portion of each cathode plenum and at least a portion of each cooling air plenum. Further, each stackable tray of the present invention preferably includes a plurality of spaced ribs protruding from both the first and second sides of the panel so that the ribs protruding from the first side of the panel spaces the panel from the cell cases and the air cathodes and the ribs protruding from the second side of the panel spaces the panel from the cell cases.

According to another aspect of the present invention, a metal-air cell with improved resistance to electrolyte leakage is provided. This metal air cell includes a case including a first member having an outer peripheral edge and a second member having an outer peripheral edge contiguous with the outer peripheral edge of the first member. An anode is disposed within the case adjacent the first member and a substantially planar air cathode is disposed within the case, the air cathode having an air side and an electrolyte side, the air side of the cathode being positioned adjacent the second member. An electrolyte solution is disposed within the case between the anode and the electrolyte side of the air cathode. The electrolyte side of the air cathode is supported within the case and a first gas-permeable, liquid-impermeable membrane is disposed within the case between the second member and the air side of the cathode. The first membrane covers the air side of the air cathode and has an outer periphery extending beyond the air side of the air cathode. The outer periphery of the first membrane extends proximate to the contiguous peripheral edges of the first and second members of the case. The first member, the second member, and the outer periphery of the first membrane are welded together along the contiguous outer peripheral edges of the first and second members of the case to form a single, integral, liquid-impermeable seal about the case, so that the anode, air cathode, and electrolyte are completely encapsulated within a liquid-impermeable enclosure.

Because of the structural simplicity of the cell of the present invention and, in particular, the impermeable seal which is easily formed in a single step by welding, the cell of the present invention is relatively inexpensive to manufacture. In addition, because electrolyte leakage normally occurs along seams of a metal-air cell case, the single, welded, integral seal of the metal-air cell of the present invention is a particularly advantageous feature. This novel seal provides a substantially leak-proof enclosure for the electrolyte. In addition, because there is only a single seal about the cell of the present invention, the potential for electrolyte leakage is minimized.

The metal-air cell of the present invention preferably includes a grid support on the air side of the air-cathode. The second member of the cell case includes this grid which is positioned adjacent at least a portion of the membrane-covered cathode. This grid preferably has an open portion for exposing the first membrane to air. In addition, the metal air cell of the present invention preferably includes a support having a peripheral side wall extending substantially perpendicularly from the first member of the cell case to the grid of the second member for supporting the first membrane. Still more preferably, the second member of the cell case includes a peripheral side wall extending substantially perpendicularly to the peripheral edge of the second member and the outer periphery of the first membrane extends between the peripheral side wall of the second member and the peripheral side wall of the support means. The air cathode support preferably extends proximate to the contiguous peripheral edges, the first membrane preferably extends between the case and the air cathode support, and the air cathode support is also preferably welded to the first membrane and the case along the seal.

The first member, the second member, the first membrane and the membrane support each preferably comprise a polymeric material which forms an integral bond when heat welded. The welded polymeric material is relatively easily heat welded and provides an inexpensive and lightweight metal-air cell. Most preferably, the first member, second member, first membrane and membrane support of the metal-air cell include polypropylene or other polyolefins which are resistant to corrosion by the electrolyte, and may be made liquid impermeable and either gas permeable or gas impermeable.

The metal-air cell of the present invention also preferably includes an opening in the first member of the cell case covered with a second liquid-impermeable, gas-permeable membrane for releasing gas from the liquid-impermeable enclosure. Gas, such as hydrogen, which may be formed during the electrolytic reaction within the cell, may be released through the second membrane.

Therefore, it is an object of the present invention to provide an improved metal-air power supply.

Another object of the present invention is to provide an improved secondary metal-air power supply.

Another object of the present invention is to provide a metal-air power supply that allows one to exploit the maximum useful life of the metal-air cells.

Another object of the present invention is to minimize the likelihood of flooding or drying out metal air cells.

Another object of the present invention is to improve the energy density of a metal-air power supply.

Another object of the present invention is to provide an improved air manager system for a metal-air power supply.

Another object of the present invention is to provide an improved metal-air cell.

Another object of the present invention is to provide a leak-resistant metal-air cell.

Another object of the present invention is to provide a metal-air cell which is relatively easy to manufacture, inexpensive, and adaptable for incorporation into multiple-cell battery packs.

Another object of the present invention is to provide a system for arranging metal-air cells in multiple cell battery packs.

Other objects, features and advantages of the present invention will become apparent from the following detailed description and claims.

BRIEF DESCRIPTION OF DRAWINGS

FIG. 7 is a logic flow diagram of the routine followed by the microcontroller of the electronic system shown in FIG. 6 when the power supply is on.

FIG. 11 is a sectional frontal elevation view of the cell shown in FIG. 9 before heat welding.

FIG. 12 is a sectional fontal elevation view of the cell shown in FIG. 9 after heat welding.

FIG. 13 is a sectional side elevation view of the cell shown in FIG. 9.

FIG. 16 is a partial side elevation view showing a single metal-air cell of the battery pack used in the metal-air power supply of FIG. 14.

FIG. 17 is a partial side elevation view showing the interior of the metal-air cell compartment shown in FIG. 16.

FIG. 18 is an end elevation view of the metal-air power supply shown in FIG. 14.

FIG. 22A is a partial frontal elevation view of the fan housing of the metal-air power supply shown in FIG. 14 with the switch in the "on" position.

FIG. 22B is a partial plan view of the fan housing of the metal-air power supply shown in FIG. 14 with the switch in the "on" position.

FIG. 22C is a partial side elevation view of the fan housing of the metal-air power supply shown in FIG. 14 with the switch in the "on" position.

FIG. 24A is a partial frontal elevation view of the fan housing of the metal-air power supply shown in FIG. 14 with the switch in the "recharge" position.

FIG. 24B is a partial plan view of the fan housing of the metal-air power supply shown in FIG. 14 with the switch in the "recharge" position.

FIG. 24C is a partial side elevation view of the fan housing of the metal-air power supply shown in FIG. 14 with the switch in the "recharge" position.

DETAILED DESCRIPTION

Figure 1:
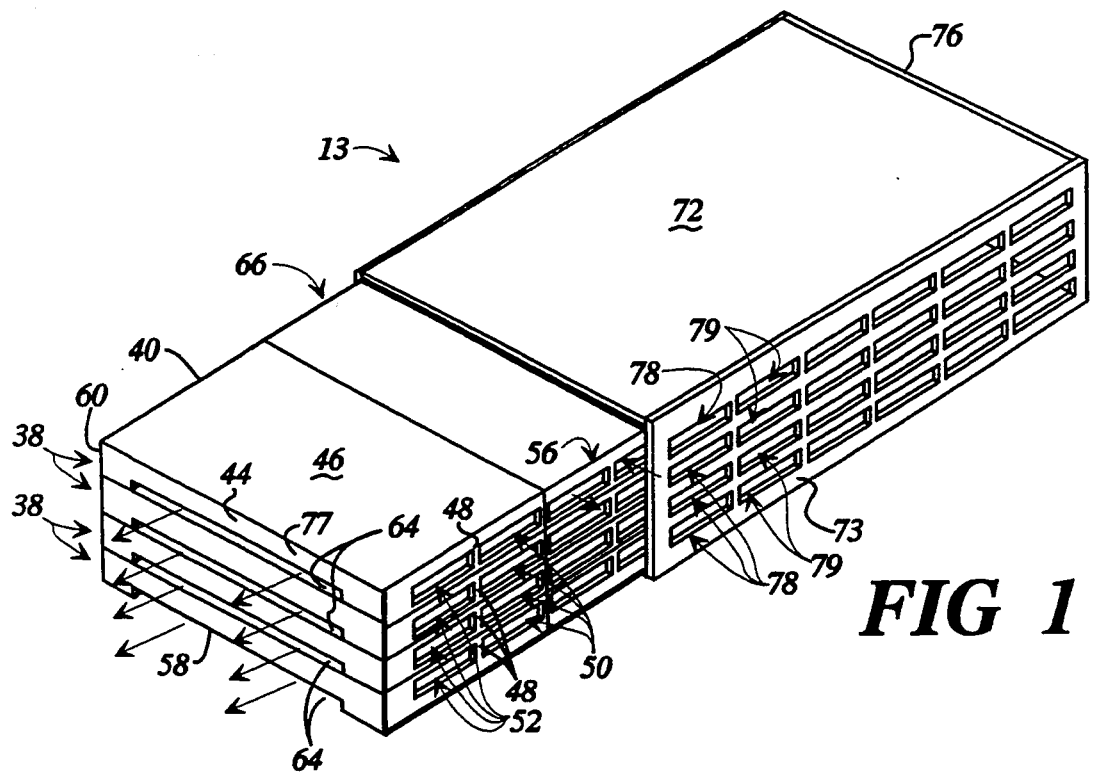
FIG. 1 is a perspective view of a preferred metal air battery pack for use in a preferred embodiment of a metal-air power supply of the present invention. The battery pack is partially pulled out of the pad surrounding the pack.
Figure 2:
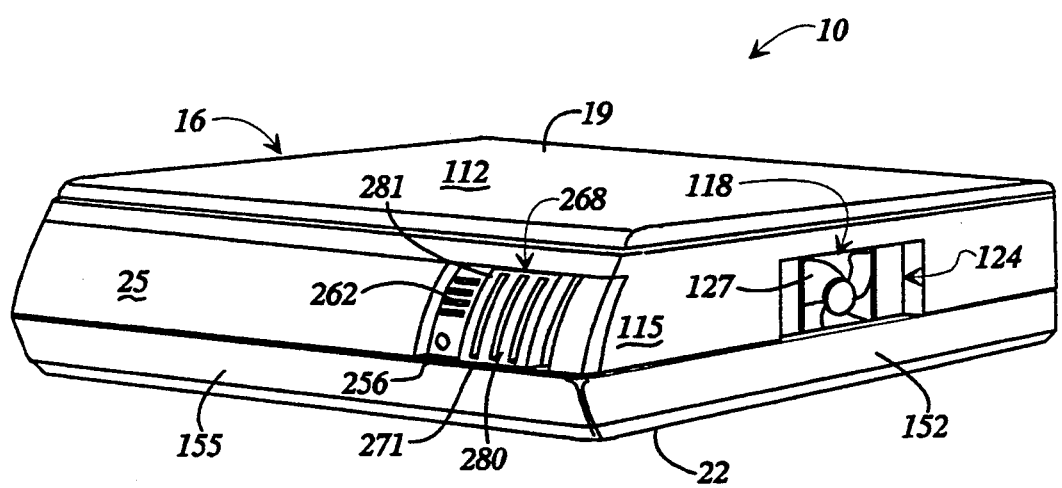
FIG. 2 is a perspective view of a preferred embodiment of a metal-air power supply of the present invention showing the fan side of the power supply.

A metal-air power supply 10 made in accordance with a preferred embodiment of the present invention is shown in FIGS. 2–4. A metal-air cell battery pack 13 for use in the power supply 10 is best shown in FIG. 1. As will be described in more detail below, the power supply 10 includes a box-shaped housing 16 having an upper frame 19, a lower frame 22, a front panel 25, and a rear panel 28. Inside the housing 16, barriers 31, 34, and 37 form an arrangement of plenums for directing air through the power supply 10. The housing operates as an air manager system for the battery pack 13. The battery pack 13 fits in the housing 16 between the rear panel 28 and the first barrier 31.

The battery pack 13 includes 12 individual, 1-volt metal-air battery cells 38 arranged in three stacks of four individual cells. The cells 38 may be zinc-air cells or another type of metal-air cell. It should be understood that the power supply 10 may be adapted for use with any number of individual metal-air cells. In addition, it should be understood that each metal-air cell may be made of conventional metal-air cell components provided that the air cathode and case of each cell are structured and the individual metal-air cells are shaped and arranged to cooperate with the air-massager system such as is described below.

Figure 4A:
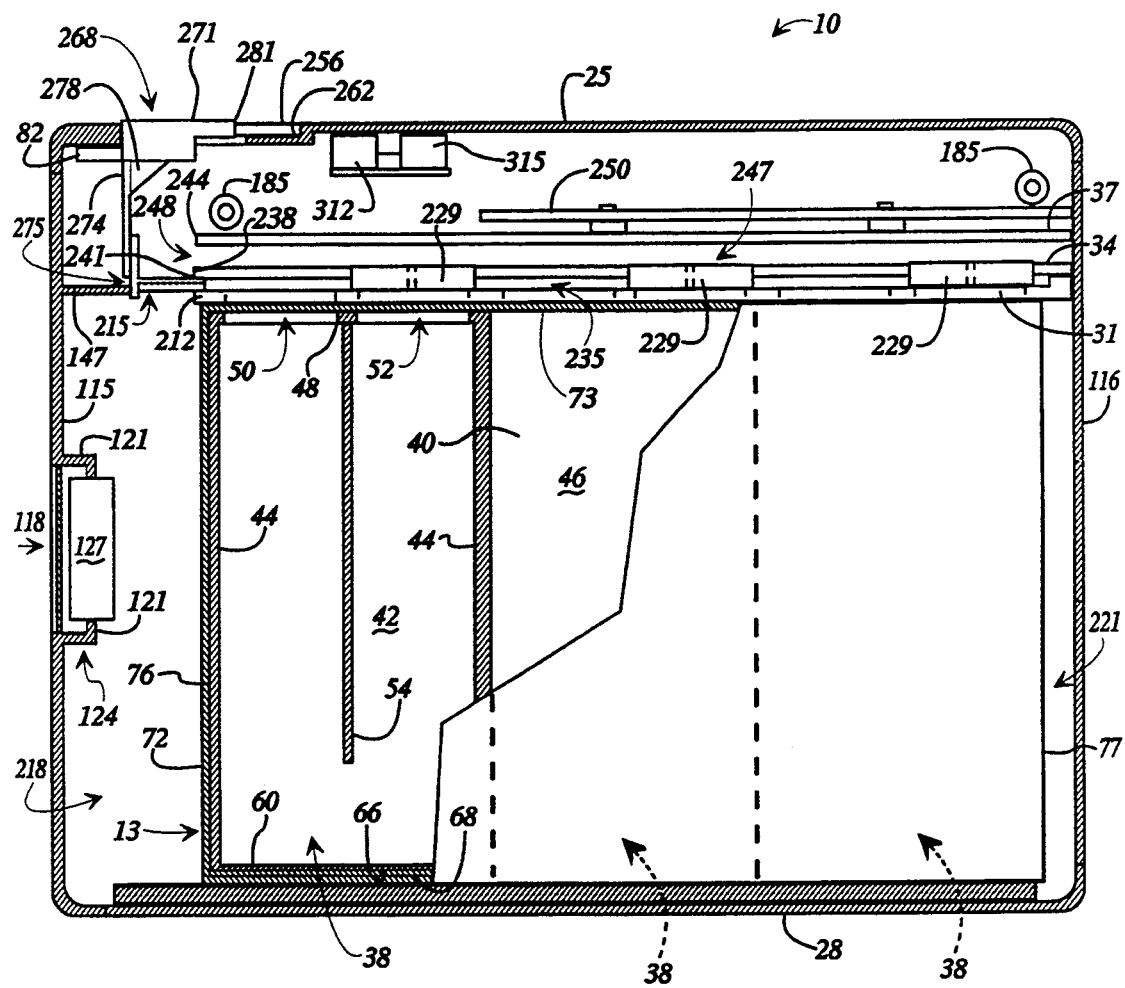
FIG. 4A is plan view of the power supply shown in FIG. 2 with the top portion of the housing and the top cover of one battery cell cut away.
Figure 4B:
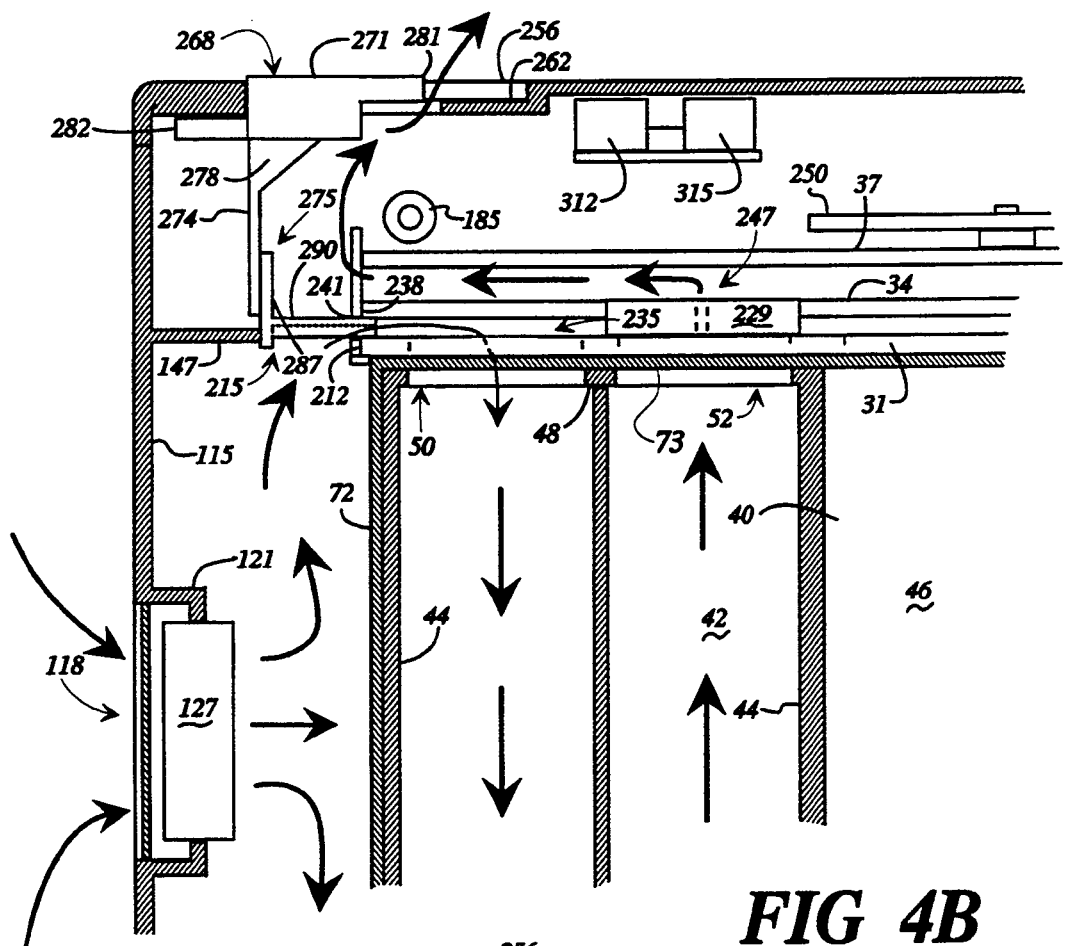
FIG. 4B is a partial plan view of the power supply shown in FIG. 2 showing the switch in the "on" position.
Figure 4C:
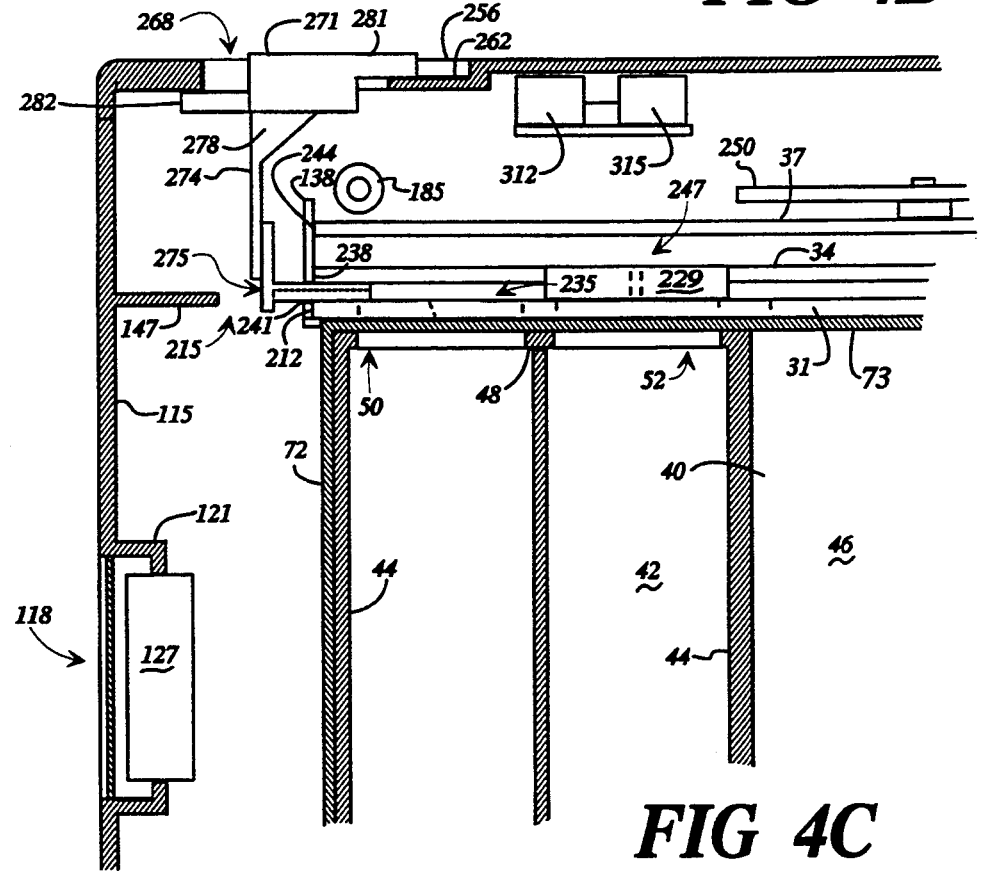
FIG. 4C is a partial plan view as in FIG. 4B except that the switch is in the "recharge" position.
Figure 4D:
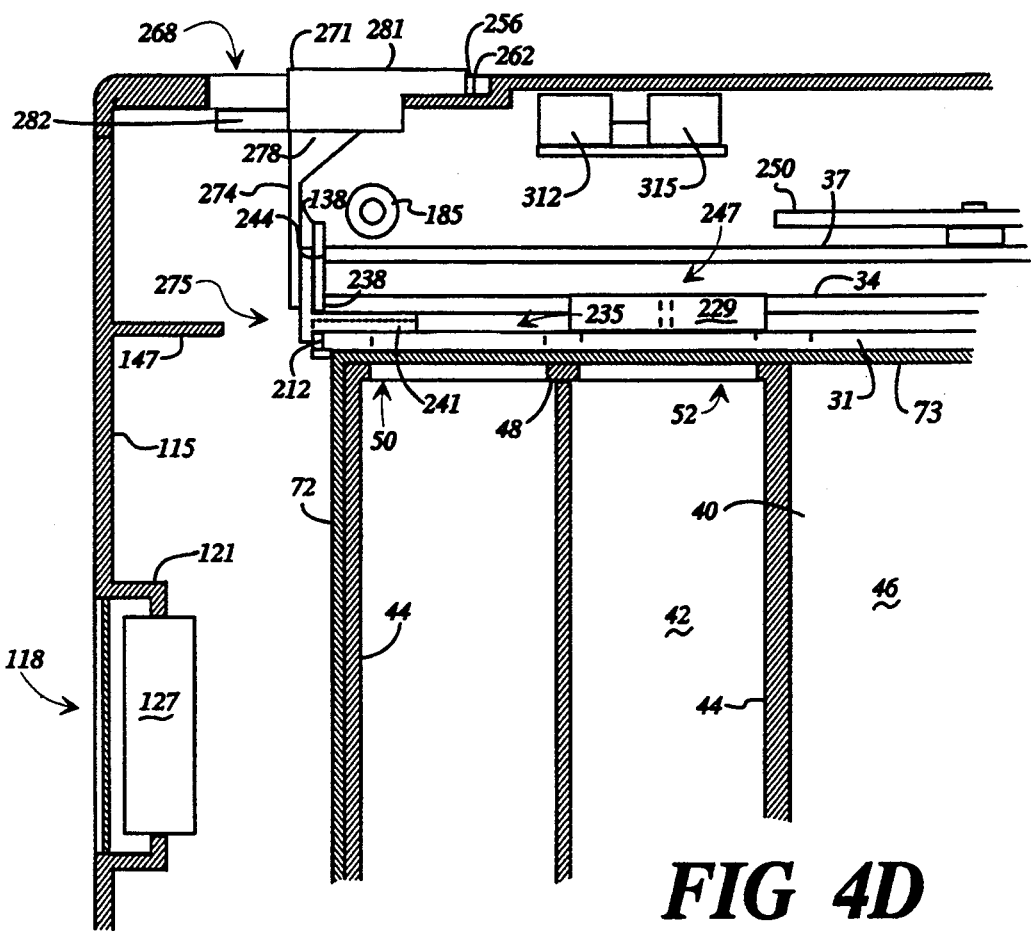
FIG. 4D is a partial plan view as in FIG. 4B except that the switch is in the "off" position.

As can be seen from FIGS. 1 and 4A–D, each individual cell 38 of the battery pack 13 includes a cell case 40 which contains a metallic anode (not shown) and an air cathode 42 with electrolyte therebetween. Sidewalls 44 and a top cover 46 of each cell case 40 form a cathode air plenum above each air cathode 42. One end 48 of each cell defines cathode plenum inlet orifices 50 and cathode plenum outlet orifices 52 for air flow in and out of the cathode plenum of each cell 38. A divider 54 extends from each top cover 46 to the respective air cathode 42 and defines an air flow path through the cathode plenum of each cell 38. The air flow path is shown in FIG. 4B. The battery pack 13 is preferably arranged so that the cathode plenum inlets and outlets 50 and 52 extend along the forward side 56 of the battery pack 13.

Each cell 38 of the battery pack 13 also has a recessed bottom 58 so that when the individual cells are stacked and connected at opposite ends 48 and 60, the recessed bottoms define cooling air plenums 64 which extend across the length of the battery pack. The cooling air plenums 64 are isolated from the air cathode 42.

The cell case 40 of each individual cell 38 is preferably made of a plastic material, such as polypropylene, which is resistant to chemical corrosion. The individual cells 38 may be connected with conventional means known to those skilled in the art but are preferably connected with adhesive or fused by welding.

Electrode tabs (not shown) extend from each individual cell 38 along the rearward side 66 of the battery pack 13 opposite the forward side 56 of the battery pack which has the cathode plenum inlets and outlets 50 and 52. The electrode tabs are connected to an electrode connector board 68 which extends along the rearward side 66 of the battery pack 13. The electrode connector board 68 carries electrical current to and from the individual cells 38. Metallic tabs (not shown) extend from one end of the electrode connector board 68 and connect the cells 38 to the electronic circuitry for the battery pack as explained below.

Figure 3A:
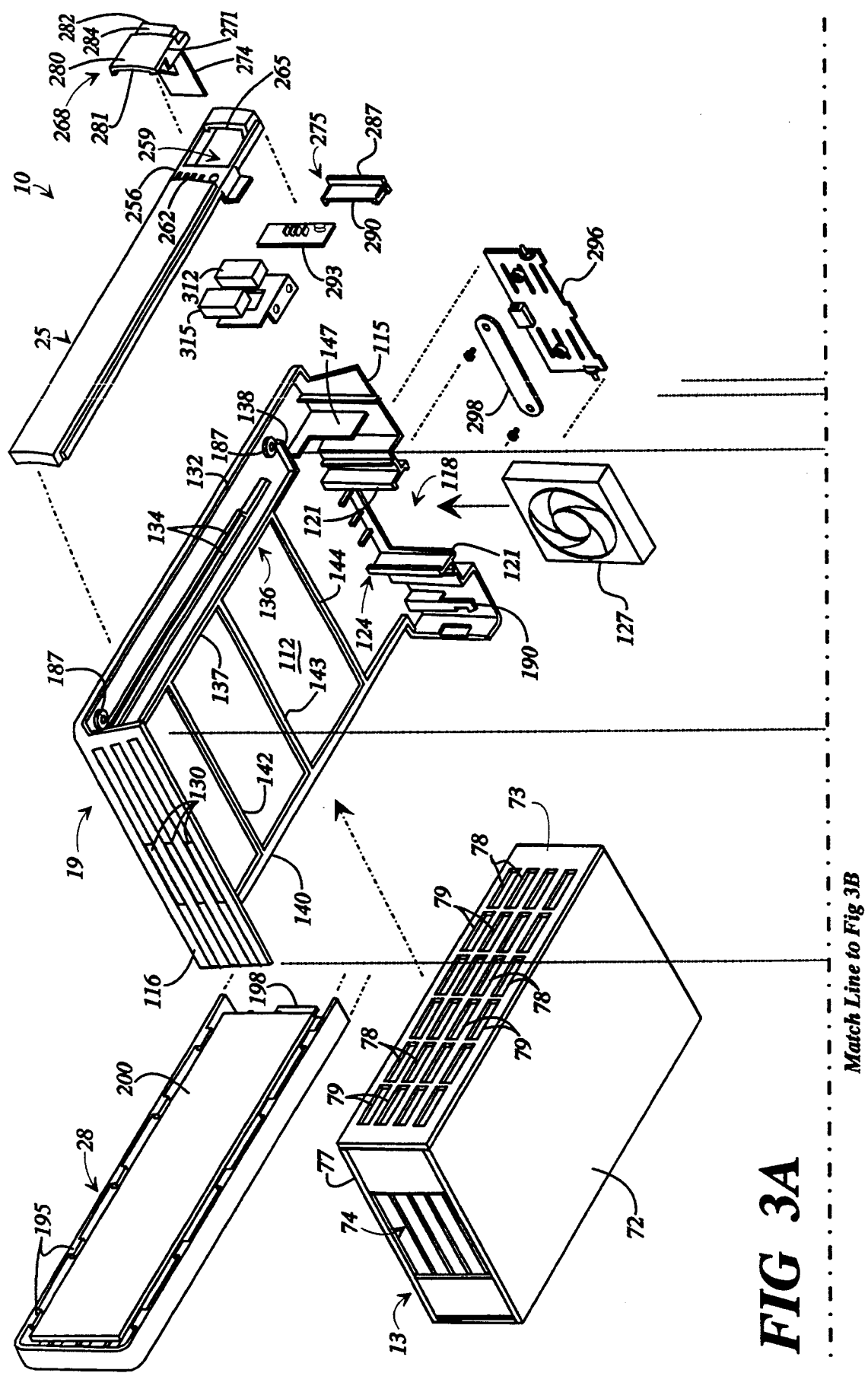
FIGS. 3A and 3B show an exploded view of the power supply shown in FIG. 2.

As best shown in FIGS. 1 and 3A, the battery pack 13 is preferably wrapped with a covering 72, such as cardboard, about all sides of the battery pack except the forward side 56 which is covered by a gasket pad 73 preferably made of a polymeric foam material. The covering 72 has rectangular openings 74 at opposite ends 76 and 77 of the battery pack 13 to allow flow of cooling air through the cooling air plenums 64. The gasket pad 73 includes openings 78 and 79 aligned with the cathode plenum inlets and outlets 50 and 52 of the metal-air cells 38. The portion of the covering 72 at one end 77 of the battery pack 13 is not shown in FIG. 1.

As shown in FIGS. 2–5, the power supply 10 includes an upper frame 19 and a lower frame 22 which are attached to form the box-shaped housing 16. The housing 16 and the majority of components of the power supply 10 are preferably made of a light-weight and chemically resistant plastic material such as polypropylene or acrylonitrile butadiene styrene (ABS). These components are preferably made by injection molding techniques well known to those skilled in the art.

As best shown in FIG. 3A, the upper frame 19 includes a top panel 112 and side panels 115 and 116 extending integrally from opposite ends of the top panel. One side panel 115 includes an air intake opening 118 defined by arms 121 which extend inwardly to form an upper frame 124 for a fan 127. The opposite side panel 116 of the upper frame 19 has three horizontal slots 130 which provide a cooling air outlet.

The top panel 112 of the upper frame 19 includes an arrangement of integral ribs which extend from the interior surface of the top panel 112. First, one rib 132 extends along the forward edge of the top panel 112 between the side panels 115 and 116. A set of closely spaced parallel ribs 134 extends along top panel 112 spaced from the forward rib 132 to form a narrow channel in the top panel. An L-shaped rib 136 is spaced further inwardly from the forward rib 1.32 than the parallel ribs 134, the L-shaped rib having a long leg 137 parallel with the forward rib and extending from the side panel 116 to a short leg 138 which extends perpendicularly from the long leg towards the forward rib 132.

Another rib 140 extends along the rearward edge of the top panel 112 between the side panels 115 and 116. Three additional ribs 142, 143 and 144 spaced from one another extend across the upper panel 112 from the rearward rib 140 to the long leg 137 of the L-shaped rib 136. This arrangement of ribs provides structural support for the top panel 112 and creates a seal between the pad 72 surrounding the battery pack 13 and also provides support for additional components of the airmanager system 10 as will be described below.

The upper frame 19 also includes an L-shaped wall 147 which extends perpendicularly from the one side panel 115 towards the short leg 138 of the L-shaped rib 136.

Figure 3B:
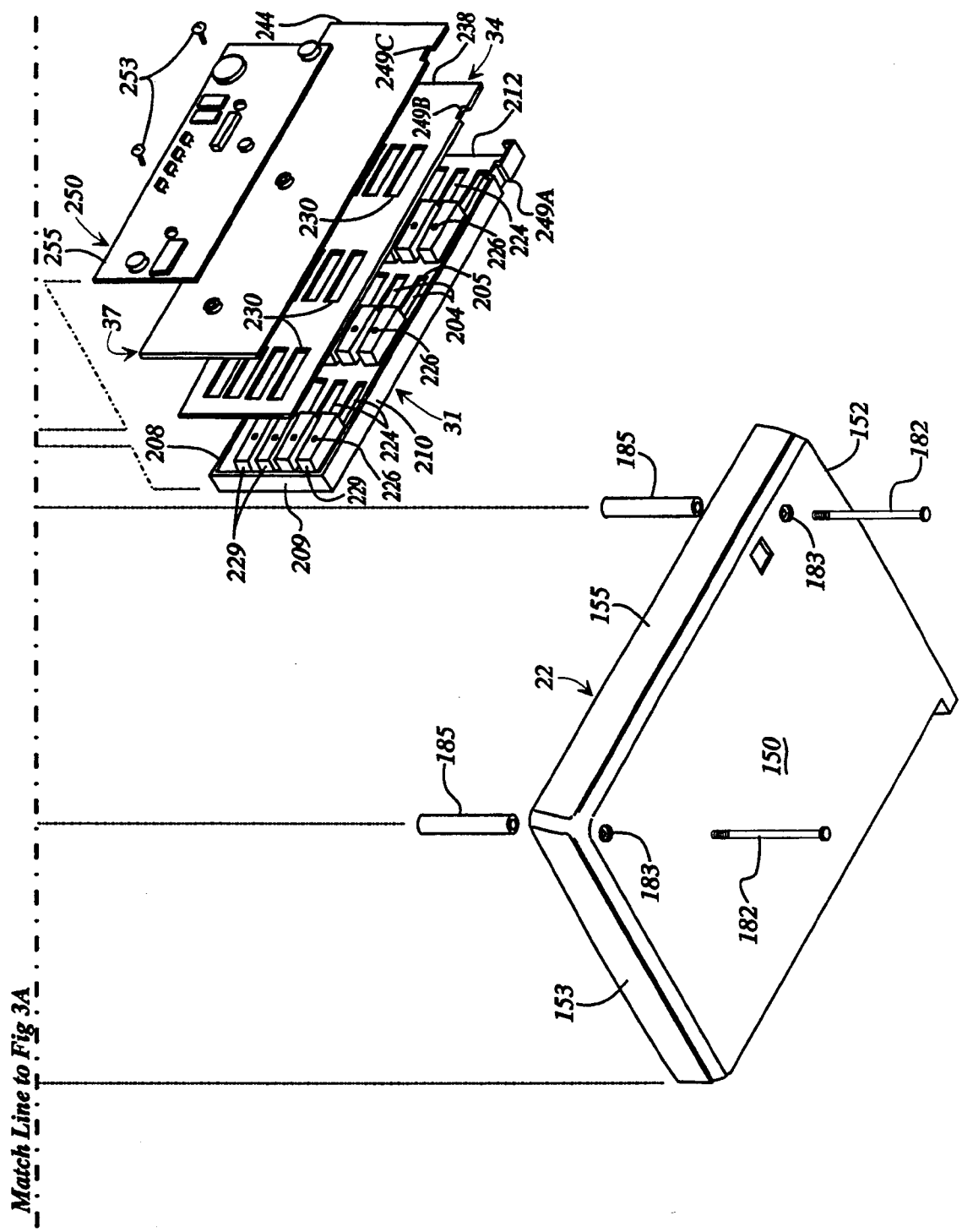
Figure 5:
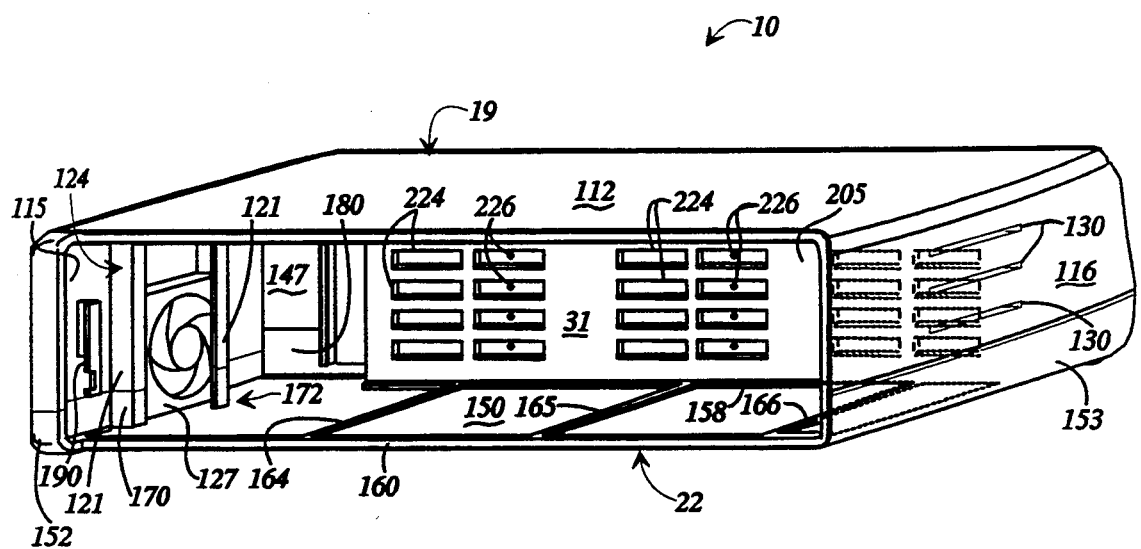
FIG. 5 is a perspective view of the power supply shown in FIG. 2 with the back panel and battery pack removed from the housing.

As best shown in FIGS. 3B and 5, the lower frame 22 includes a bottom panel 150 and three panels, including two side panels 152 and 153 and a forward panel 155, extending integrally from the bottom panel. The lower frame 22 includes an arrangement of integral ribs on the interior surface of the bottom panel 150. This arrangement of ribs is very similar to the arrangement of ribs on the interior surface of the upper frame 19. This arrangement of ribs includes a rib (not shown) which corresponds to the parallel ribs 134 in the top panel 112 of the upper frame 19. This rib extends from the one side panel 153 towards the other side panel 152. The bottom panel 150 also includes an L-shaped rib 158 which corresponds to the L-shaped rib 136 of the upper frame 19. The L-shaped rib 158 extends from the side panel 153 towards side panel 152 along the bottom panel 150 and is spaced from the forward panel 155. In addition, the bottom frame 22 includes another rib 160 extending between the side panels 152 and 153 along the rearward edge of the bottom panel 150. Three additional ribs 164, 165 and 166 extend integrally across the bottom panel 150 between ribs 158 and 160 and are spaced from one another. The arrangement of ribs on the bottom panel 150 provides structural support for the bottom panel.

Arms 170 extend inwardly from one side panel 152 of the bottom frame 19 towards one another to form a lower frame 172 for supporting the fan 127. In addition, an L-shaped wall 180 extends from the one side panel 152 and the bottom panel 150 towards the L shaped rib 158.

The upper and lower frames 19 and 22 are fastened together with bolts 182 which extend through holes 183 in the bottom panel 150 and standoffs 185 into threaded nuts 187 extending integrally from the upper panel 112. The upper and lower frames 19 and 22 are also fastened by hooks 190 which extend from the side panels 115 and 116 of the upper frame and fit matingly into keepers which extend from side panels 152 and 153 of the lower frame.

The rear panel 28 of the housing 16 fits over the rearward opening of the housing. The rear panel 28 includes a series of tabs 195 extending inwardly from horizontal edges of the rear panel for gripping the rearward edges of the upper and lower frames 19 and 22. Another tab 198 extends outwardly from one vertical edge of the rear panel 28 and snaps into a recess in side panel 152 of the lower frame 22. The tabs 195 fit into grooves in the rearward edges of the upper and lower frames 19 and 22 so that the rear panel 28 is removed and replaced by sliding back and forth along the rearward end of the housing. A pad 200 extends inwardly from the rear panel 28 to form a seal between the rear panel and the rearward side of the battery pack 13. The pad 200 is preferably made of a polymeric foam material.

As mentioned above, the power supply 10 includes barriers 31, 34 and 37 which form an arrangement of plenums for directing air through the housing 16 and battery packs. These are best illustrated in FIGS. 3A, 3B and 4A-D. The first barrier 31 extends vertically between the bottom panel 150 and the top panel 112 proximate the front panel 25 of the housing 16. Specifically, the first barrier 31 includes a vertical panel 205 and three elongate sides 208, 209 and 210 extending integrally and forwardly from the vertical panel along three edges of the vertical panel. No side extends from one end 212 of the vertical panel 205. The upper side 208 of the first barrier 31 fits between the L-shaped rib 136 of the top panel 112 and the parallel ribs 134 of the top panel, the vertical side 209 of the first barrier fits against the side panels 116 and 153, and the lower side 210 of the first barrier fits between the L-shaped rib 158 of the bottom panel 150 and the rib of the bottom panel spaced from and parallel thereto. The open end 212 of the first barrier 31 fits against the shorter leg 138 of the L-shaped rib 168 and is spaced from the L-shaped walls 147 and 180. The open end 212 of the first barrier 31 is substantially aligned with the L-shaped walls 147 and 180. The L-shaped walls 147 and 180 and the open edge 212 of the first barrier define an opening 215.

As mentioned above, the battery pack 13 fits in the housing 16 between the rear panel 28 and the first barrier 31. The first barrier 31 extends along and adjacent to the forward end 56 of the battery pack and the forward ends 48 of the metal air cells 38. Opposite sides 76 and 77 of the battery pack are spaced from respective side panels 115, 116, 152 and 153 to form an air intake plenum 218 and a cooling air outlet plenum 221. As best shown in FIG. 4A, the air intake plenum 218 is positioned between the side 76 of the battery pack 13 and the side panels 115 and 152 adjacent the fan 127. The cooling air outlet plenum 221 is positioned between the battery pack 13 and side panels 116 and 153. The rearward side 66 of the battery pack 13 fits adjacent the rear panel pad 200, the forward side 56 of the battery pack fits adjacent the vertical panel 205 of the first barrier 31, the top of the battery pack fits adjacent the ribs 142, 143 and 144 of the top panel 112, and the bottom of the battery pack fits adjacent the ribs 164, 165 and 166 of the bottom panel 150. As a result, the gasket pad 73 is sandwiched between the battery pack 13 and the first barrier 31 so that there is a substantially airtight seal between the battery pack and the first barrier.

As shown in FIG. 5, the vertical panel 205 of the first barrier 31 includes a plurality of inlet and outlet orifices 224 and 226 which are aligned with the cathode plenum inlets and outlets 50 and 52 respectively of the battery cells 38. Ducts 229 define the outlet orifices 226 of the first barrier 31 and extend forwardly from the vertical panel 205 beyond the sides 208, 209 and 210 of the first barrier, as shown in FIG. 3B. The ducts 229 are spaced from one another to allow the free flow of air therebetween.

The second barrier 34 has a plurality of orifices 230 which sealingly receive the ducts 229 of the first barrier 31 and fits sealingly against the three sides 208, 209 and 210 of the first barrier to form a reactant air inlet plenum 235 between the first and second barriers. As shown in FIG. 4A, the second barrier 34 also extends from the side panels 116 and 153 to the short leg 138 of the L-shaped rib 136. In addition, the second barrier 34 has a vertical edge 238 which along with the open edge 212 of the first barrier 31 forms an inlet opening 241 to the reactant air inlet plenum 235.

The third barrier 37 also fits between the top panel 112 and bottom panel 150 and against the side walls 116 and 153. The third barrier 37 is spaced from the second barrier 34 and is positioned between the second barrier and the front panel 25. The third barrier 37 extends from the side panels 116 and 153 to an edge 244 which abuts the short leg 138 of the L-shaped rib 136 and is spaced from the side panels 115 and 152. The second and third barriers 34 and 37 define a reactant air outlet plenum 247 and the vertical edges 238 and 244 of the second and third barriers define a reactant air outlet plenum outlet opening 248. The vertical edges 212, 238 and 244 of the first, second and third barriers 31, 34 and 37 are preferably aligned with one another. In addition, recesses 249A, 249B and 249C in barriers 31, 34 and 37, respectively, form a wire path for connecting the fan 127 and battery pack 13 to the electronic circuitry of the air-manager system 10.

A circuit board 250 is attached to the forward side of the third barrier 37 with screws 253. The upper edge 255 of the circuit board 250 fits into the groove between the parallel ribs 134 and the top panel 150. The components of the circuit board will be described below.

As best shown in FIGS. 2, 3A and 4A, the front panel 25 fits over the opening in the forward end of the housing 16 and extends from one side panel 152 of the upper frame 19 to the other side panel 153 of the upper frame. The front panel 25 includes a recessed portion 256 proximate the fan side 152 of the upper frame 19. The recessed portion 256 has a rectangular opening 259 substantially aligned with the opening 215 and an LED display panel 262 adjacent the side of the rectangular opening 259 towards the cooling air outlet side 153 of the upper frame 19. The portion of the front panel 25 adjacent the side of the rectangular opening 259 opposite the LED panel 262 forms a channel 265.

A switch 268 fits in the rectangular opening 259 and moves across the rectangular opening in a direction parallel with the front panel to three positions including: (1) a closed or "off" position for periods of nonuse of the battery pack, (2) a center or "recharge" position during which the battery pack is recharged, and (3) an open or "on" position during which the battery pack 13 discharges electrical energy. The switch 268 is shown in the on position in FIGS. 4A and 4B, the recharge position in FIG. 4C and the off position in FIG. 4D.

The switch 268 includes a front plate 27 1 which fits over the rectangular opening 259 in the front panel 25 and slides back and forth therein. The switch 268 also includes a plate 274 which extends perpendicularly from the front plate 271 and is welded to an air door 275 mounted within the housing 16. A support member 278 extends from the perpendicular plate 274 to the front plate 271. The air door 275 moves back and forth parallel to the front panel 25 along with the front plate 271.

The front plate 271 of the switch has a substantially planar frontal portion 280 with a leading edge 281 and a trailing edge 282. The underside of the frontal portion 280 steps inwardly from the leading edge so that the leading edge slides over the LED panel 262 when the switch 268 is moved to the off position. The outer portion of the front plate 271 steps inwardly from the trailing edge and forms a plug 284 that slides within the channel 265 of the front plate 25. The plug 284 fits within the channel 265 when the switch 268 is in the on position. The front plate 27 1 is sized so that the rectangular opening 259 is closed by the front plate when the switch is in the off position and so that there is a gap between the leading edge 281 and the LED display panel 262 for air flow therethrough when the switch is in the on position. In the recharge position, the switch 268 is positioned intermediate the on and off positions so that there remains a small gap between the leading edge 281 and the LED display panel 262 so that there is still some air flow between the leading edge and the LED display panel.

The air door 275 includes a cover plate 287 which is welded to the perpendicular plate 274 of the switch 268 and a U-shaped flow guide 290 which extends integrally from the cover plate into the reaction air inlet plenum 235. The U-shaped flow guide 290 is slideably engaged within the reactant air inlet plenum 235. The air door 275 reciprocates across the opening 215 while the U-shaped flow guide 290 reciprocates within the reactant air inlet plenum 235. The open side of the flow guide 290 faces the rear panel 28 and guides air from the air intake plenum 218 into the reactant air inlet plenum 235. The air door 275 is sized so that the cover plate 287 closes the inlet opening 24 1 of the reactant air inlet plenum 235 and the outlet opening 248 of the reactant air outlet plenum 247 when the switch 268 is in the off position so that air flow to the air cathodes 42 of the battery pack 13 is shut off. The switch 268 is also sized so that when the switch 268 is in the on position the air door 275 directs air flow through the reactant air inlet plenum inlet opening 241 into the reactant air inlet plenum 235 and prevents air flow through the air inlet opening 215 directly into the forward portion of the housing 16.

An LED board 293 is mounted behind the LED display panel 262 so that the LED signal units protrude through holes in the LED display panel. The LED display may be used to signal the status of the battery pack. For example, the LED display may be used to indicate whether the battery pack is discharging or recharging and the level of charge remaining in the battery cells as is understood by those skilled in the art.

A cord door 296 is mounted across the upper fan frame 160 and a cord wrap 298 is mounted to the cord door for securing electrical wires which connect the air battery pack 13 and electronic system to an outlet and a charger jack.

Figure 6:
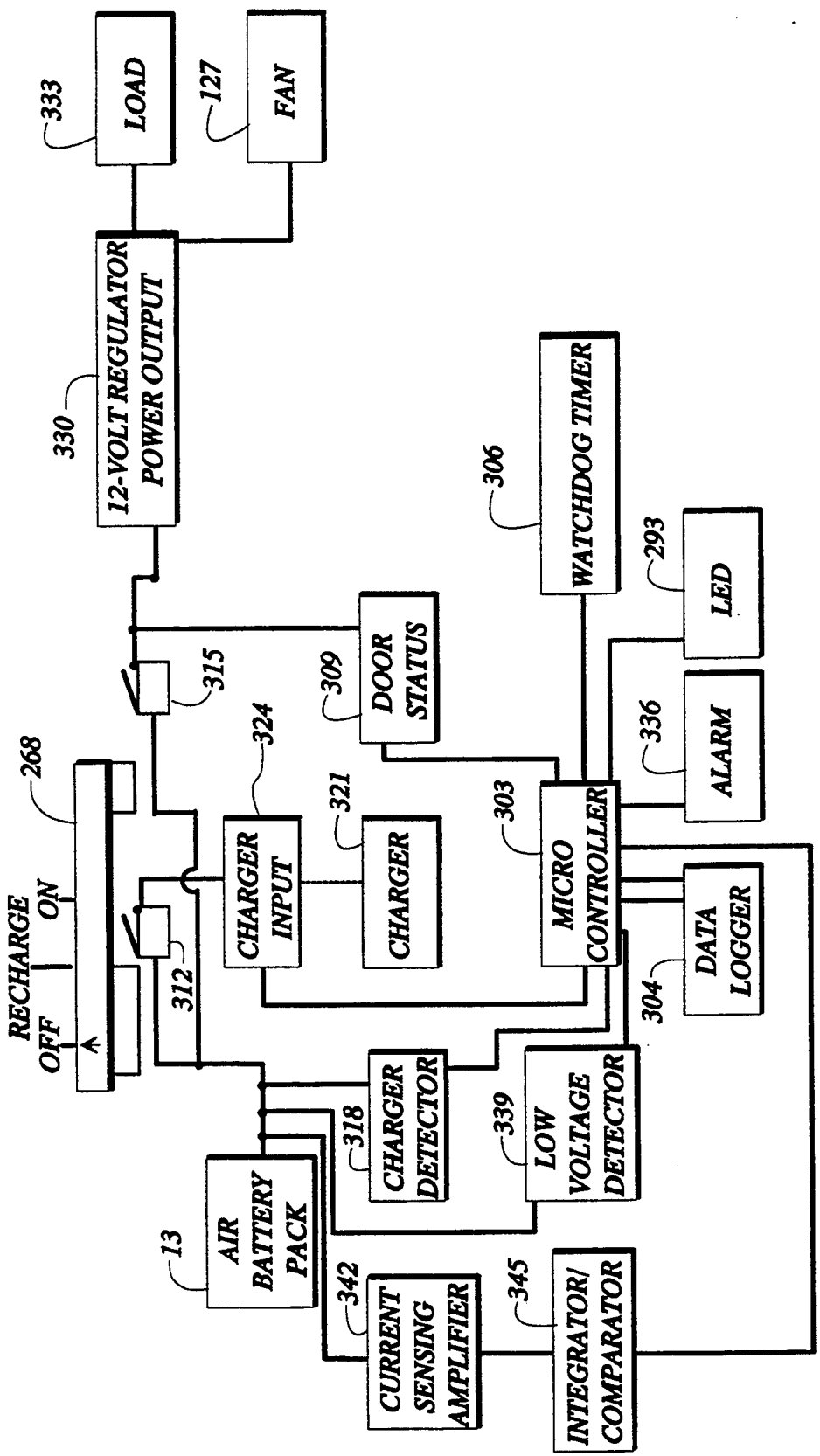
FIG. 6 is a block diagram illustrating the electronic system for the power supply shown in FIG. 2.

An electronic system for operating the power supply 10 can be designed by one skilled in the art. FIG. 6 shows an outline of an electronic system 300 for use with the air manager system 10 and battery pack 13. A detailed circuit diagram of the electronic system 300 is set forth in the Appendix.

The electronic system 300 includes a microcontroller 303 which functions as the brain of the power supply. An appropriate microcontroller 303 is a Signetics 87C751 8-bit microcontroller. This is a 24-pin CMOS device which contains 2K×8 ROM for program storage, a 64 by 8 RAM for variable storage, a 16-bit counter-timer used to wake up the chip during power-down idle mode, 19 input/output lines, and an $I^2$ C interface which is used to communicate data for data logging. The 87C751 microcontroller 303 preferably includes a 3.58 MHZ crystal which has an active current draw of only 4 mA. This provides for a low average current draw. The logic of the microcontroller 303 will be explained in more detail below.

An EPROM chip 304 performs data logging for the microcontroller 303. The I² C interface of the microcontroller 303 communicates data to and from the data logger 304.

A watchdog timer 306 prevents the microcontroller 303 from locking up due to power fluctuations, glitches, electrostatic discharges and the like. An appropriate watchdog timer 306 is an LMC555 watchdog timer. As long as the microcontroller 303 is operating properly, the microcontroller will periodically send a charge pulse to the watchdog timer 306 to keep the reset line of the microcontroller inactive. However, if the microcontroller 303 is hung up for any reason, the watchdog timer 306 will activate the reset line of the microcontroller and free the microcontroller from the hung condition. The watchdog timer 306 will then release the microcontroller 303 from the reset state. The microcontroller 303 should then resume normal operation and continue periodically sending pulse signals to keep the reset line of the microcontroller inactive.

The switch 268 of the power supply 10 operates a door status circuit 309, a first microswitch 312 and a second microswitch 315. As explained above, the switch 268 may be set in three positions, including (1) a closed or "off" position for when the air battery is not in use; (2) a center or "recharge" position for when the air battery is being recharged; and (3) an open or "on" position for when the power supply is used to power a load such as a personal computer.

When the switch 268 is in the off position, the door status circuit 309, the first microswitch 312, and the second microswitch 315 are not engaged, and the battery pack 13 is disconnected from the remainder of the electronic system 300. When the switch 268 is in the recharge position, the first microswitch 312 is engaged. This connects the air battery pack 13 to a charger detector 318 and a charger 321 through a charger input circuit 324. The microcontroller 303 can then enable charging for the air battery pack 13 if the charger is connected to the electronic system 300 in a manner described below. When the switch 268 is in the on position, both the first microswitch 312 and the second microswitch 315 are engaged. The second microswitch connects the air battery pack 13 to the 12-volt regulator power output circuit 330 which connects the battery pack 13 to the fan 127 and the 12-volt regulator power output circuit 330 connects the battery pack to the fan and the desired load 333 and maintains the output of the battery pack at 12 volts.

The door status circuit 309 is a zener diode clamp circuit used to indicate door status to the microcontroller 303. When the switch 268 is in the off or recharge position, the door status circuit is unpowered and the door status circuit output is 0 volts. This output is fed to the microcontroller 303 which interprets this signal as a logic 0 state. When the switch 268 is in the on position, the door status circuit 309 is powered by the battery pack 13 and the door status circuit output is at a predetermined voltage level, preferably 4.7 volts for the 12-volt battery. This is a logic 1 state which is fed to the microcontroller 303. Thus, the microcontroller 303 is able to resolve between the on position of the switch 268 and either the recharge position or off position of the switch. This information is used by the microcontroller 303 to enable or disable the battery charger 321 by turning the charger input circuit 324 on or off, for activating an alarm 336 if no load is present, and for determining whether the battery pack 13 is discharging or being charged.

The charger 321 is not part of the air manager system 10 but is connected thereto via a conventional electric charger jack. Metal-air cell chargers are known to those skilled in the art and thus are not discussed here in detail.

The charger detector 318 includes a zener diode clamp circuit and is used to indicate the presence of the charger 321. For the 12-volt battery pack 13, the charger detector 318 preferably includes a 4.7-volt zener diode clamp circuit. The input of the charger detector 318 is fed by the first microswitch 312 which is connected to the charger 321 through a charger input jack. The charger input circuit 324 includes a transistor such as an HEXFET IRF9551 transistor which is turned on and off by the microcontroller 303.

When the switch 268 is in the on or recharge position, the first microswitch is engaged and the first microswitch connects the charger 321 to both the charger detector 318 and the charger input circuit 324. If the charger 321 is connected to the electronic system 303 and powered up, the charger detector 318 will send a signal to the microcontroller 303 indicating the presence of the charger. For the 12-volt battery pack 13, this signal is a 4.7-volt signal. When the charger 321 is not connected to the charger jack or is not powered up, a 0-value signal is sent from the charger detector 318 to the microcontroller 303 which interprets this signal to mean that the charger is not present. When the charger 321 is present, and the switch 268 is in the recharge position, the microcontroller 303 turns on the charger input circuit 324 which electrically connects the air battery pack 13 to the charger 321 through the charger input circuit. The microcontroller 303 relies on input from the door status circuit 309 which indicates that the switch 268 is not on. If the switch 268 is in the on position, the microcontroller 303 reads the input from the door status circuit 309 and does not turn the charger input circuit 324 on or, if necessary, turns the charger input circuit off, to avoid charging while the air battery pack 13 is on.

When the switch 268 is in the on position, the second microswitch 315 connects the battery pack 13 to the 12-volt regulator power output circuit 330 which allows discharge of electrical energy from the battery pack to the fan 127 and the desired load 333. A low voltage detector 339 monitors the battery pack voltage and signals the microcontroller 303 when this voltage drops below a preset threshold. For the 12-volt battery pack 13, the preset threshold is preferably about 10.8 volts. When the air battery drops below 10.8 volts, the low-voltage detector sends a logic 0 signal to the microcontroller 303 which samples this signal line periodically, preferably every second. Upon detecting this low level of voltage, the microcontroller 303 monitors the low-voltage signal, and if the low-voltage signal continues for a predetermined time period, preferably about 30 seconds, then the date and time of the low-voltage signal may be logged to signify initiation of the low-voltage detect event and the microcontroller activates the alarm 336 to alert the operator of the low-voltage condition. The alarm continues to sound until the low-voltage condition is connected such as by plugging in the charger 321 and recharging the battery.

A current sensing amplifier 342 measures the charge and discharge currents through the battery pack 13. The current sensing amplifier 342 includes a resistor which generates a voltage drop from the current passing through the battery pack 13. This voltage drop is amplified and subtracted from a predetermined voltage bias level to produce a negative output voltage with respect to the predetermined voltage bias level. This negative output voltage is then fed to an integrator/comparator 345. This causes the integrator to ramp upwards until the integrator output reaches a predetermined comparator trip level. When the integrator output has ramped from the initial voltage bias level to the trip level of the comparator, the output of the integrator/comparator 345 to the microcontroller 303 changes from a logic 1 signal to a logic 0 signal. This logic 0 signal causes the microcontroller 303 to short out the integrator and prepare the integrator for the next integrating cycle and causes the microcontroller to increment or decrement the internal integrator count the data logger 304 microcontroller by a predetermined amount. The microcontroller 303 examines the door status to determine if the internal integrator count should be incremented or decremented. The internal integrator count is incremented if the switch 268 is in the recharge position and the internal integrator count is decremented if the switch is in the on position. The microcontroller 303 checks the integrator count to insure it remains within a predetermined range. If the integrator count exceeds the predetermined maximum threshold, the microcontroller turns off the charger input circuitry 324 to prevent overcharging of the battery pack 13.

The microcontroller 303 may be programmed to send signals to the LED display 293 to indicate the level of charge remaining in the battery based on the integrator count. Such a program can be designed by one skilled in the art and thus is not discussed here in detail.

To operate the power supply 10 to power a load 333, the switch 268 is put in the on position. In response, the door status circuit 309, the first microswitch 312, and the second microswitch 315 are engaged. The door status circuit 309 which is connected to the battery pack 13 sends a signal to the microcontroller 303 that the switch 268 is on and thus is not in the recharge or off positions. The microcontroller 303 then begins its logic routine which is set forth in FIG. 7.

Figure 7:
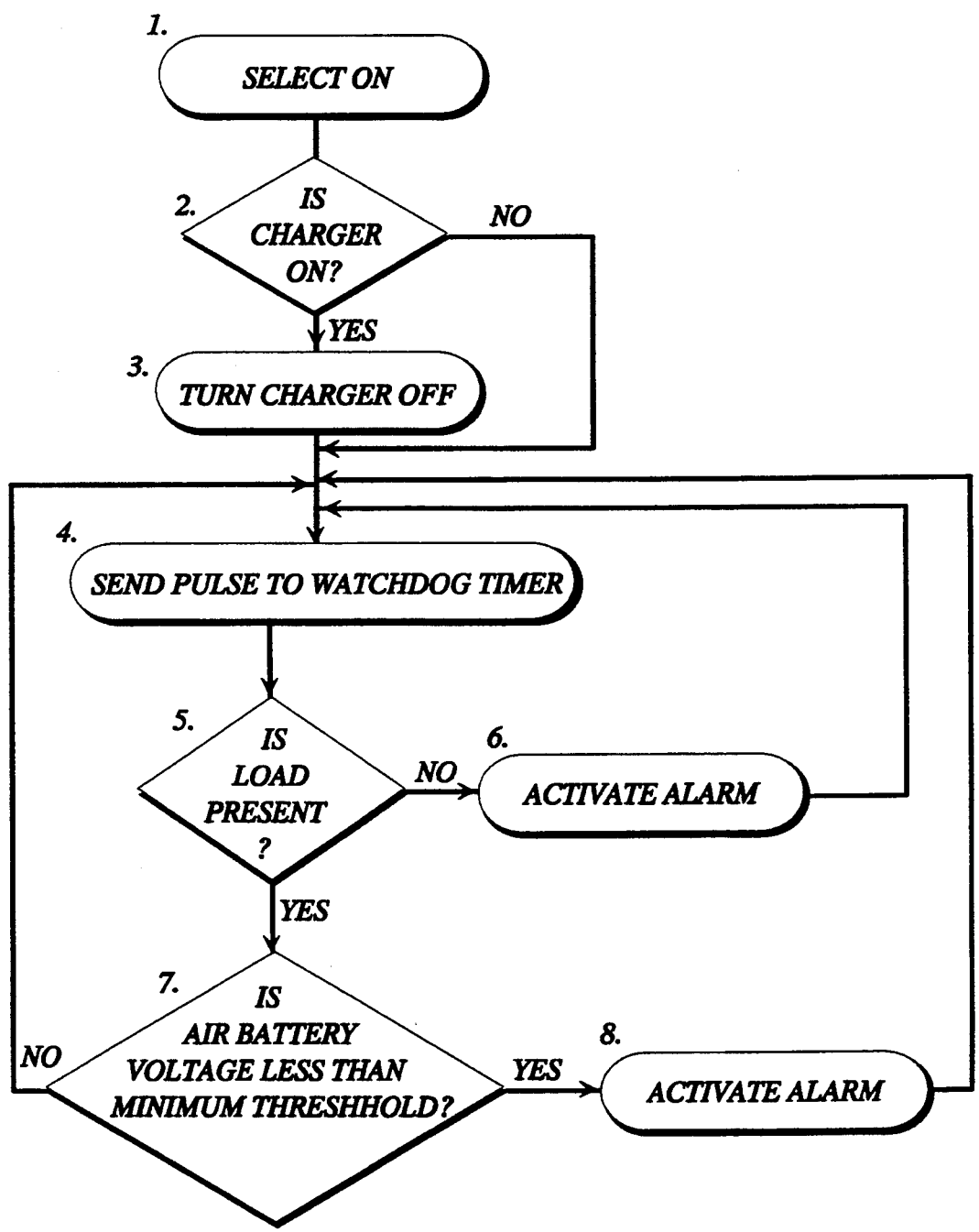

As illustrated in FIG. 7, when the switch 268 is put in the on position as set forth in block 1, the microcontroller 303 next asks if the charger 321 is on. If the charger is on, the microcontroller 303 turns the charger input circuit 324 off as set forth in block 3. If the charger 321 is not on, the microcontroller 303 begins sending periodic pulses to the watchdog timer 306 as set forth in block 4. The microcontroller 303 then asks if a load is present as set forth in block 5. If no load is present, the microcontroller 303 activates the audible alarm 336 as set forth in block 6. The microcontroller 303 continues to send pulses to the watchdog timer and inquire as to the presence of a load until a load is connected. When a load is present, the microcontroller 303 then asks whether the battery pack voltage is less than a predetermined minimum threshold as set forth in block 7. The low-voltage detector 339 provides this information to the microcontroller 303. If the battery voltage is less than the predetermined minimum threshold, the microcontroller 303 activates the audible alarm 336 and continues its inquiry until the battery pack voltage is equal to or greater than the predetermined minimum threshold. If the battery pack voltage is equal to or greater than the predetermined minimum threshold, the microcontroller 303 continues to send pulses to the watchdog timer 306 and continues to monitor the presence of a load and the battery voltage.

When the switch 268 is placed in the on position, the second microswitch 315 immediately connects the battery pack 13 to the 12-volt regulator power output circuit 330, which connects the battery pack to the fan 127. Residual power in the battery pack 13 starts the fan 127 which pumps air through the air-manager system 10 and over the air cathodes 42 to generate more current from the battery pack 13. The 12-volt regulator power output circuit 330 also connects the air battery pack 13 to the load 333. The battery pack 13 thereby provides electrical power to the load 333.

The air produced by the fan 127 flows through the air intake opening 118 in the housing 16 and into the air intake plenum 218. A first portion of this air flow is directed over the air cathodes 42 of the individual battery cells 38. This first portion is referred to hereinafter as the reactant portion. A second portion of the air flow flows through the cooling air channels 64 of the battery pack 13 and exits through the slots 130 in the side panel 116 of the upper housing frame 19. This second portion is referred to hereinafter as the cooling portion.

As explained above, the cooling portion of the air flowing through the cooling air plenum 64 is isolated from the air cathodes 42 of the battery cells 38 and functions to cool the metal-air cells.

When the switch 268 is in the on position, there is a gap between the leading edge 281 of the switch and the LED display panel 262 to allow air flow through the rectangular opening 259 in the front panel 25. In addition, the air door 275 which moves with the switch 268 is positioned so that the opening 215 is blocked and the entire reactant portion of the air flow is directed by the air door into the reactant air inlet plenum 235 through the inlet opening 241. In the on position, the air door 275 does not block the reactant air outlet plenum outlet opening 248.

Accordingly, when the switch 268 is in the on position, the reactant portion of the air flow created by the fan 127 flows from the intake plenum 218, through the inlet opening 241 into the reactant air inlet plenum 235, through the inlet orifices 224 of the first barrier 31 and the inlet orifices 50 of the metal-air 38, over the air cathodes 42 of the cells by following the path defined by the dividers 54, out of the cells through the outlet orifices 52 of the cells, the ducts 229, and the outlet orifices 226 of the first barrier, into the reactant air outlet plenum 247, out the reactant air outlet plenum outlet opening 248, and then out of the housing 16 through the rectangular opening 259 in the front plate 25. The ducts 229 provide a discrete path across the reactant air inlet plenum 235 for the air exiting the cathode plenums. In addition, the air intake plenum 218 and the reactant air inlet plenum 235 surround the cooling air inlets and reactant air inlets from the exhausted reactant and cooling air. This prevents the air exiting the cathode and cooling plenums from mixing with the air entering the cathode and cooling air plenums. As understood by those skilled in the art, the air flowing over the air cathodes 42 supplies oxygen for the electrolytic reaction in the individual metal-air cells 38 which produces the electric current supplied by the battery pack 13.

The outlet orifices 226 of the first barrier 31 are sized so as to limit the reactant portion of the air flow supplied by the fan 127 to a volumetric flow rate sufficient to produce a predetermined level of current from each battery cell 38 with minimal evaporation of water from the battery cells through the air cathodes 42. It should be understood that the inlet orifices 224 of the first barrier 31, instead of the outlet orifices 226, could also be used to control the flow rate of the reactant portion of air flow. For the 12-volt battery pack 13 disclosed herein, the predetermined level of current from each cell 38 is preferably 1.25 amps per cell with a voltage of about 1 volt per cell. In addition, for the 12-volt embodiment, the diameter of the outlet orifices 226 of the first barrier 31 is preferably about 0.080 inches. The outlet orifices 226 preferably limit the reactant portion of the air flow to a volumetric flow rate sufficient to provide 3 to 10 times the stoichiometric amount of oxygen necessary to produce the predetermined level of current from the metal-air cells 38. More preferably, the reactant portion of the air flow is limited to a volumetric flow rate sufficient to provide 4 to 5 times stoichiometric amount of oxygen. In the 12-volt embodiment utilizing zinc-air cells, with a diameter of the outlet orifices 226 being about 0.080 inches, the flow rate of the reactant portion of the air flow, is about 1 liter per minute. As is understood by those skilled in the art, if a higher level of current is desired, the air flow rate should be higher.

The fan 127 preferably produces a total volumetric flow rate of air sufficient so that the cooling portion of the air flow, has a volumetric flow rate sufficient to maintain the battery cells 38 below a temperature less than about 20° F. above ambient temperature. The cells 38 are preferably kept below about 90° F. The cooling portion of the air flow preferably has a volumetric flow rate from about 10 to about 1000 times the flow rate of the reactant air flow rate.

For the 12-volt embodiment utilizing zinc-air battery cells, a suitable fan is a MICRONEL US F-62 LM/MM012DNGK fan. This fan operates on 1.1 watts and delivers 14 cubic feet per minute of air. This fan has relatively low power needs and delivers sufficient air flow. Preferably, the fan 127 operates with a level of current that is about 10% of the predetermined current level produced by the battery pack. This limits the power drain by the fan on the battery pack and improves the overall energy density of the power supply.

When the power supply 10 is not in use, the switch 268 is moved to the off position. In the off position, the rectangular opening 259 in the front panel 25 is closed by the front plate 271 of the switch and the reactant air inlet plenum 235 and the reactant air outlet plenum 247 are sealed by the cover plate 287 of the air door 275. Specifically, the cover plate 287 of the air door 275 covers the inlet opening 241 of the reactant air plenum 235 and the outlet opening 248 of the reactant air outlet plenum 247. This seals the air cathodes 42 of the cells 38 from oxygen and prevents unnecessary discharge of the battery pack and drying out of the cells during periods of nonuse.

Figure 8:
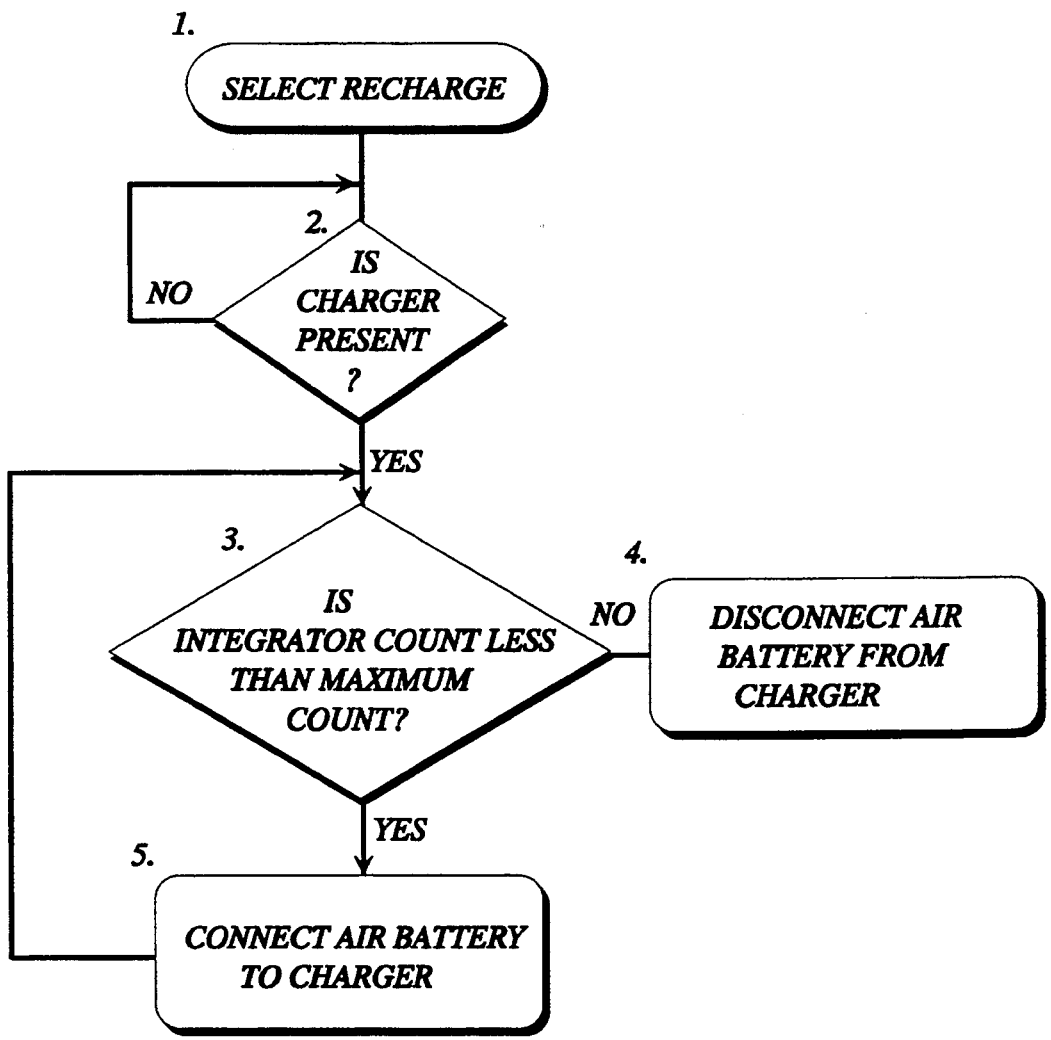
FIG. 8 is a logic flow diagram of the routine followed by the microcontroller of the electronic system shown in FIG. 6 when the power supply is being recharged.
Figure 9:
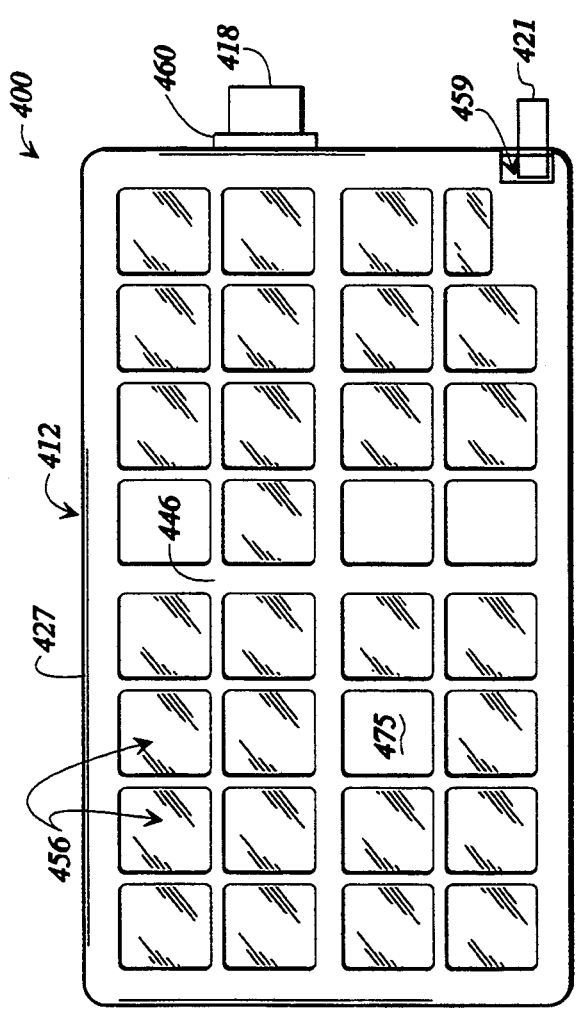
FIG. 9 is a plan view of the top of a preferred embodiment of the metal-air cell of the present invention.
Figure 10:
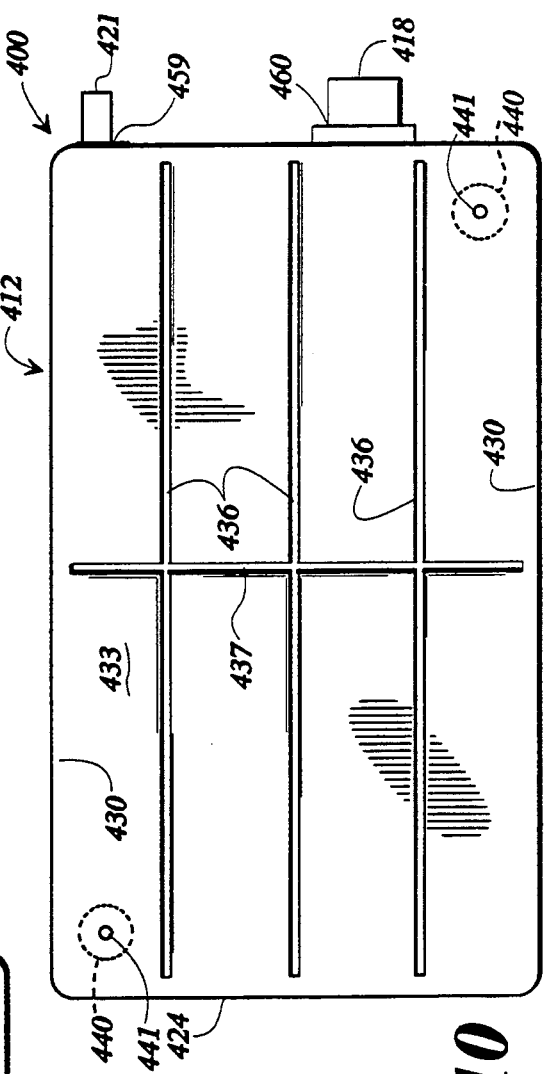
FIG. 10 is a plan view of the bottom of the cell shown in FIG. 9.

The battery pack 13 is recharged by connecting a battery charger 321 to the recharge jack connected to the first microswitch 312. The switch 268 is then placed in the recharge position thereby engaging the first microswitch 312. When the switch 268 is in the recharge position, the microcontroller 303 begins the logic routine outlined in FIG. 8. First, the microcontroller 303 asks if the charger is present as shown in block 2. Input from the charger detector circuit 318 indicates whether the charger is present. If the charger is not present, the microcontroller 303 continues its inquiry until the charger 321 is connected to the charger jack. If the charger is present, the microcontroller 303 asks if the integrator count is less than the predetermined maximum count. As explained above, the current sensing amplifier 342 and integrator/comparator 345 monitor the level of charge of the air battery pack 13. If the integrator is less than the predetermined maximum count, the microcontroller 303 connects the air battery to the charger as set forth in block 5 by turning the charger input circuit 324 on. The air battery pack 13 is then recharged until the switch 268 is turned off or on, or the integrator count becomes equal to or exceeds the predetermined maximum count. When the integrator count is equal to or exceeds the maximum integrator count, the microcontroller 303 automatically disconnects the air battery pack 13 from the charger 321 by turning off the charger input circuit 324.

According to another aspect of the present invention, a substantially leakproof metal-air cell is provided. A preferred embodiment 400 of this metal-air cell is shown in FIGS. 9-13. The metal-air cell 400 includes an anode 403, a cathode 406, and electrolyte 409 disposed in a cell case 412, As will be explained in more detail below, the anode 403, the cathode 406, and the electrolyte 409 are contained within a liquid impermeable enclosure in the cell case 412.

A suitable anode is a wrapped, zinc anode such as that disclosed in U.S. Pat. No. 4,957,826 the disclosure of which is expressly incorporated herein by reference. The anode 403 is wrapped in a sheet 413 of absorbent, wettable, oxidation-resistant woven or non-woven cloth such as cotton, rayon, modified CMC or wettable plastic fibers. Suitable electrolyte is an aqueous base including a group I metal hydroxide such as LiOH, NaOH, KOH, CsOH, or the like, as disclosed in U.S. Pat. No. 4,957,826. The anode 403 includes a metallic current collector screen which has a lead 418 extending therefrom to provide a positive terminal for the cell 400.

A suitable cathode is a porous, sheet-type cathode including an active layer directly adhered to a gas permeable, liquid-impermeable, wet-proofing layer as disclosed in U.S. Pat. Nos. 4,354,958; 4,518,705; 4,615,954; 4,927,514; and 4,444,852, the disclosures of which are expressly incorporated herein by reference. The active layer of the cathode 406 forms the electrolyte side 422 of the cathode and faces the electrolyte 409. The active layer includes catalyzed particles of activated carbon and particles of a hydrophobic polymer such as polytetrafluoraethylene (Teflon). The wet-proofing layer forms the air side 423 of the cathode 406 and includes a mixture of carbon black particles and Teflon particles. The cathode 406 includes an expanded metal sheet current collector which has a lead 421 extending therefrom for connection to a positive terminal for the cell 400.

The cell case 412 includes a substantially planar, rectangular, first member 424 and a substantially rectangular second member 427 having the shape of an inverted tray. The first member 424 is heat welded to the second member to form the rectangular box-shaped case 412.

The first member 424 of the cell case 412 has an outer peripheral edge 430 surrounding a substantially planar panel 433. The outer peripheral edge 430 of the second member is slightly raised before heat welding as shown in FIG. 11. The panel 433 of the first member 424 has a plurality of channels 436 extending along the length of the first member and another channel 437 extending across the width of the first member perpendicular to the plurality of channels. The channels 436 and 437 allow the first member 424 to remain substantially planar during expansion of the metal-air cell. The first member 424 is preferably made of a plastic material such as polypropylene which is resistant to corrosion from electrolyte and is easily heat welded.

The panel 433 of the first member 424 has a plurality of recesses 440 with a central hole 441 therein covered with a gas-permeable, liquid-impermeable membrane 443. This membrane 443 releases a gas which builds up inside the metal-air cell 400 during operation but does not allow leakage of electrolyte. The membrane is preferably a porous polypropylene material such as CELGARD microporous membranes available from Hoechst Celanese Corporation in Charlotte, N.C., as well as ultrafine polyethylene 4925 available from Porex Corporation in Fairburn, Ga., in conjunction with a microporous Teflon plug produced by Fluoroglas Corporation. Preferred CELGARD microporous membranes are CELGARD 2400 and 2500 membranes. These membranes are heat welded or embossed onto the first member 424 of the case 412.

The second member 427 of the cell case 412 is formed by a substantially planar grid 446 surrounded by a peripheral side wall 449 which extends from the grid to an outer peripheral edge 453 contiguous with the outer peripheral edge 430 of the first member. The grid 446 of the second member 427 fits over the air side 423 of the cathode 406 and defines a plurality of apertures 456 which expose the cathode to air. The second member 427 also includes an opening 459 through which the cathode lead 421 protrudes and an opening 460 through which the anode lead 418 protrudes.

The case 412 also includes a peripheral support 463 which extends tightly between the first and second members 424 and 427 of the case 412 adjacent the peripheral side wall 449 of the second member. The wrapped anode 403 fits in the case 412 between the first member 424 and the electrolyte side 422 of the cathode 406.

Another gas-permeable, liquid-impermeable membrane 475 fits between the grid 446 of the second member 427 and the air side 423 of the cathode 406 and covers the air side of the cathode. This membrane 475 has an outer periphery 478 extending beyond the air side 423 of the cathode 406, around the periphery of the cathode, to a position proximate to the contiguous peripheral edges 430 and 453 of the first member 424 and the second member 427. The outer periphery 478 of the membrane 475 extends and fits tightly between the peripheral side wall 449 of the second member 427 and the peripheral support 463.

The membrane 475 is preferably TYVEK microporous polypropylene membrane available from DuPont in Wilmington, Del.

The first member 424, the second member 427, the outer periphery 478 of the membrane 475, and the peripheral support 463 are preferably heat welded together along the contiguous outer peripheral edges 430 and 453 of the first and second members to form a single integral, liquid-impermeable, gas-impermeable seal 481 about the case 412. FIG. 11 shows the cell 400 prior to heat welding and FIG. 12 shows the cell 400 after heat welding. The heat welding may be performed using a hot plate welding machine available from Forward Technologies, Minneapolis, Minn. With the seal 481, the first member 424, the second member 427, the peripheral support 463, and the membrane 475 form a liquid impermeable enclosure which completely encapsulates the anode 403, cathode 406, and the electrolyte 409.

The electrolyte 409 is injected into the cell case 412 through the first member 424 using a syringe. The small hole made by the syringe is heat sealed after the electrolyte is added.

With only a single seal 481, the cell case 412 is substantially electrolyte-leakproof. In addition, in the event electrolyte should leak past the cathode 406 and accumulate between the air side 423 of the cathode and the membrane 475 covering the cathode, the grid 446 of the second member 427 isolates the leaked electrolyte within particular apertures 456 defined by the second member grid. Accordingly, if the leaked electrolyte forms a bulge beneath the membrane 475 covering the cathode 406, the bulge is localized and is unlikely to significantly impede the flow of air over the membrane covered air cathode.

Another metal-air power supply 500 made in accordance with another preferred embodiment of the present invention is shown in FIGS. 14-19. As will be described in more detail below, the power supply 500 includes a battery pack 503 containing 12 of the metal-air cells 400 described above and a fan 504 disposed in a housing 506. The housing 506 includes a battery portion 507 which houses the battery pack 503 and a fan portion 508 which houses the fan 504.

As with the previously described power supply 10, this preferred embodiment 500 may include any number of individual metal-air battery cells 400. In addition, it should be understood that the metal-air cells 400 may be zinc-air cells or another type of metal-air cell.

The battery pack 503 and a portion of the housing 506 include four trays 510a, 510b, 510c, and 510d stacked one upon the other to form an array of cell compartments 512. The cell compartments 512 are arranged in three columns of four compartments each. The four stackable trays 510a-d are identical except that the bottom tray 510a includes a peripheral portion 513 which will be explained further below. Trays 510a and 510b are best shown in FIG. 19.

Each of the trays 510a-d includes a substantially planar and rectangular panel 515 and four partitions 518 spaced from and parallel to one another and extending upwardly and perpendicularly from the panel. A plurality of ribs 521 protrude from both sides of each panel 515 except for the panel 515 of the bottom tray 510a. The ribs 521 extend from only the top side of the panel 515 on the bottom tray 510a. The plurality of ribs 521 are spaced from one another and extend parallel to the partitions 518. Complementary projections 528 and 529 extend from the upper and lower longitudinal edges of the partitions 518 for aligning the trays 510a-d with one another. The partitions 518 extend from an inlet side 519 of the battery pack 503 to an outlet side 520 of the battery pack. Stops 531 protrude upwardly from each tray 510a-d where the partitions 518 reach the inlet side 519 of the battery pack 503.

Figure 15:
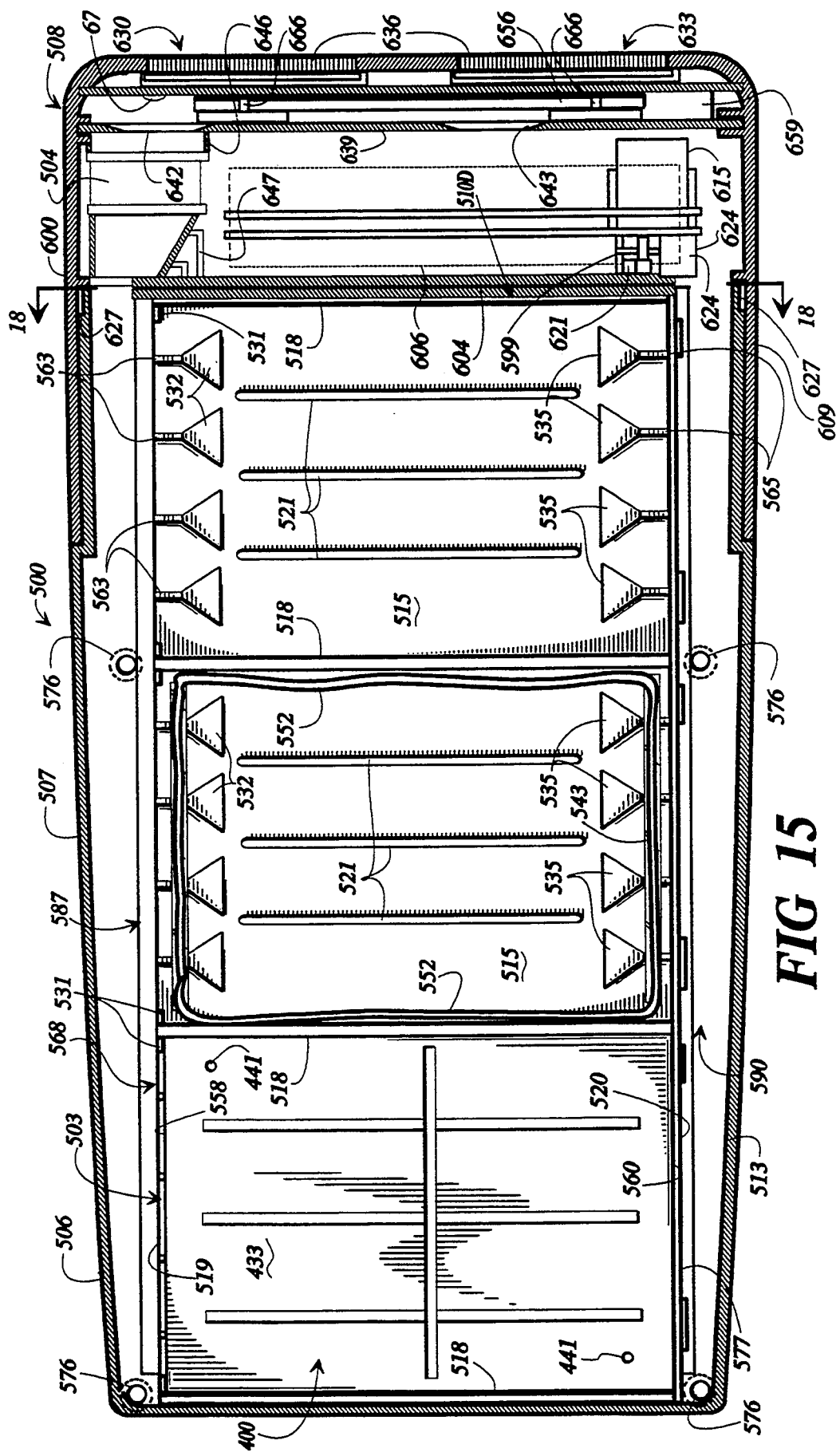
FIG. 15 is a partial plan view of the metal-air power supply shown in FIG. 14 with the top cover of the housing removed.
Figure 19:
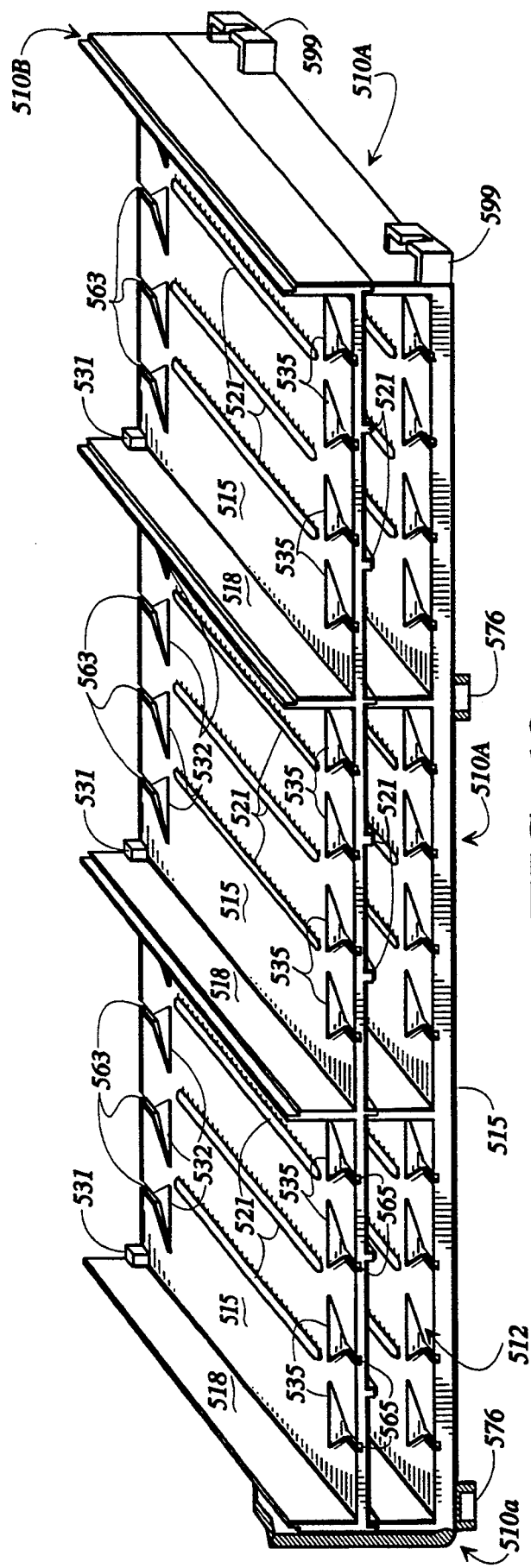
FIG. 19 is a perspective view of the bottom two trays of battery pack shown in FIG. 14.

As is best shown in FIGS. 15 and 19, funnel-shaped recesses 532 in the panels 515 of each tray 510a-d extend from the inlet side 519 of the battery pack 503 towards the interior of the battery pack. The funnel-shaped recesses 532 expand outwardly towards the interior of the battery pack 503. Substantially identical funnel-shaped recesses 535 in the panel 515 of each tray 510a-d extend from the outlet side 520 of the battery pack 503 towards the interior of the battery pack. An adhesive barrier 543 such as a strip of adhesive tape extends across a portion of each of the funnel-shaped recesses 532 and 535. Each barrier strip 543 is adhered to the interior surface of the panel 515 of each respective tray 510a–d. The barrier strips 543 each have a width which is more narrow than the length of each respective funnel-shaped recess 532 and 535 so that the funnel-shaped recesses extend beyond the width of the barrier strips to form air flow passages between the barrier strips and the panel 515 of each tray.

The metal-air cells 400 fit inside the compartments 512 formed by the trays 510a–d so that one side 548 of each cell case 4 12 through which the air cathode is exposed faces downwardly toward the side of the panels 515 having the recessed portions 532 and 535 therein. As is best shown in FIG. 17, the one side 548 of each cell case 412 rests on top of the ribs 521 protruding upwardly from the respective panels 515. This forms a cathode plenum 550 between the one side 548 of each cell case 412 and the respective panel 515. A band 552 of sealing material extends substantially along the periphery of the cathode plenum and fits sealingly between each cell case 412 and the respective tray 510a–d. Each band 552 of sealing material extends along each of the barrier strips 543 without blocking the air flow passages formed between the barrier strips and the panels 515. This allows reactant air flow to enter the cathode plenum 550 through the air passageways proximate the inlet side 519 of the battery pack 503 and exit the cathode plenum through the air flow passageways proximate the outlet side 520 of the battery pack.

The side 554 of each cell case 412 opposite the air cathode fits against the ribs 521 protruding downwardly from the adjacent panel 515. This forms a cooling air plenum 525 between the opposite side 554 of each cell case 412 and the adjacent panel 515. Each cell case 412 fits snugly between adjacent partitions 518 of the trays 510a–d so that air does not pass around the cell cases 412 from the cathode plenum 550 to the cooling air plenum 555. The cathode plenums 550 and cooling air plenums 555 extend from ends 558 of the cell cases 412 proximate the inlet side 519 of the battery pack 503 to opposite ends 560 of the cell cases 412 proximate the outlet side 520 of the battery pack. The stops 531 prevent the cells 400 from extending beyond the inlet side 519 of the battery pack 513.

The funnel-shaped recesses 532 proximate the inlet side 519 of the battery pack 503 form reactant air inlets 563 for each cathode plenum 550. Likewise, the funnel-shaped recesses 535 proximate the outlet side 520 of the battery pack 503 form reactant air outlets 565 for each cathode plenum 550. Space between the side 554 of each cell case 412 opposite the air cathode and the adjacent tray panel 515 proximate the inlet side 519 of the battery pack 503 form cooling air inlets 568 for each cooling air plenum 555. Space between the side 554 of each cell case 412 opposite the air cathode and the adjacent tray panel 515 proximate the outlet side 520 of battery pack 503 forms cooling air outlets 570 for each cooling air plenum 555.

Figure 14:
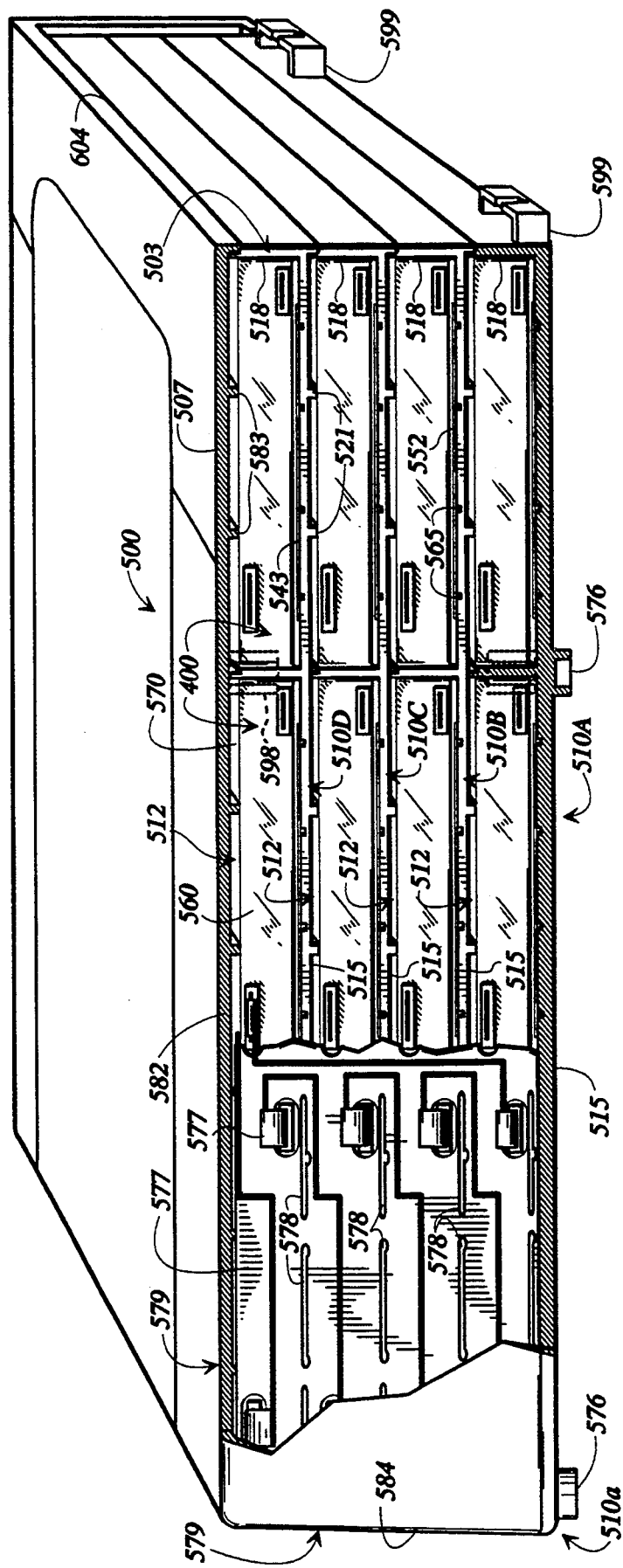
FIG. 14 is a partial perspective view of another preferred embodiment of a metal-air power supply of the present invention with a portion of the housing and electrode connector board removed.

The peripheral portion 513 of the bottom tray 510a extends outwardly and then upwardly from the inlet and outlet sides 519 and 520 of the battery pack 503 and upwardly adjacent the side 573 of the battery pack opposite the fan portion 508 of the housing 506. Four bolt jackets 576 extend upwardly from the peripheral portion 513 of the bottom tray 510a for receiving bolts (not shown) for fastening the battery portion of the housing 506 together. As shown in FIGS. 14 and 15, an electrode connector board 577 is disposed along the peripheral portion 513 of the bottom tray 510a adjacent the outlet side 520 of the battery pack 503. The electrode leads 418 and 421 are connected by the electrode connector board 577 to the electronic system of the power supply 500. The electrode connector board 577 also includes openings 578 aligned with the reactant air and cooling air outlets 565 and 570 for allowing exhausted reactant and cooling air to pass through.

A cover 579 fits over the battery pack 503 and meets the peripheral portion 513 of the bottom tray 510a to complete the box-shaped battery portion 507 of the housing 506. The cover 579 includes a top panel 582 which fits over the cells 400 and the top tray 510d of the battery pack 503. Ribs 583, identical to the ribs 521, protrude downwardly from the top panel 582 to space the top panel from the adjacent cell cases and form the upper row of cooling air plenums. A side panel 584 extends outwardly and downwardly from the top panel 582 to form portions of an air intake plenum 587 adjacent the inlet side 519 of the battery pack 503 and a portion of an exhaust plenum 590 adjacent the outlet side 520 of the battery pack. The intake plenum 587 surrounds the cooling and reactant air inlets 563 and 568 and isolates the reactant and cooling air inlets from the air exhausted from the cathode and cooling air plenums 550 and 555 through the reactant and cooling air outlets 565 and 570. The exhaust plenum 590 surrounds and isolates the reactant and cooling air outlets 565 and 570. Integral nuts 598 extend downwardly from the cover 579 for receiving the bolts which extend through the corresponding sleeves 576.

Hub mounts 599 extend integrally from the bottom tray 510a of the battery pack 503 at the open end 604 of the battery housing 507. The hub mounts 599 are used to mount the fan portion 508 of the housing 506 as will be explained further below.

The fan housing 508 includes an upper portion 600 and a lower portion 603 which are connected to form the box-shaped compartment for the fan 504 and an electronics package 606. The fan housing 508 forms a sleeve 609 which fits over and surrounds the open end 604 of the battery housing 507. A pair of thumb screws 612 secure the fan housing 508 to the battery housing 507 to complete the entire housing 506. The thumb screws 612 fit into recessed mounts 615 formed by the lower portion 603 of the fan housing 508. The thumb screws 612 include a shaft 618 which extends into nut 621 fixed within the mounts 599 extending from the bottom tray 510a of the battery pack 503. It should be understood that the fan and battery housings 507 and 508 may also be fastened by other conventional means such as adhesive, bolts, and the like.

The lower portion 603 of the fan housing 508 also forms guides 624 beside each recessed thumb screw mount 615 to guide the fan housing 508 and thumb screw shaft 618 into proper position. A O-ring seal 627 extends about the open end 604 of the battery housing 507 between the battery housing and the sleeve portion 609 of the fan housing 508 to provide a substantially airtight seal between the fan and battery housings.

The fan housing 508 includes a substantially rectangular air intake opening 630 and a substantially rectangular air exhaust opening 633. The air intake opening 630 is positioned to receive air and direct the air into the intake plenum 587 and the exhaust opening 633 is positioned to exhaust air from the exhaust plenum 590. Open cell foam pad dust filter screens 636 fit over the air intake and air exhaust openings 630 and 633 to filter particulate contaminants from the air entering the power supply 500.

A baffle plate 639 fits in the fan housing 508 behind the air intake and exhaust opening 630 and 633. The baffle plate 639 includes air inlet and outlet openings 642 and 643 at each end substantially aligned with the air intake and exhaust openings 630 and 633. The baffle plate 639 also includes a central opening 644 between the inlet and outlet opening 642 and 643. The fan 504 is mounted between ducts 646 and 647 which form a flow path from the inlet opening 642 of the baffle plate 639 to the intake plenum 587.

Figure 23C:
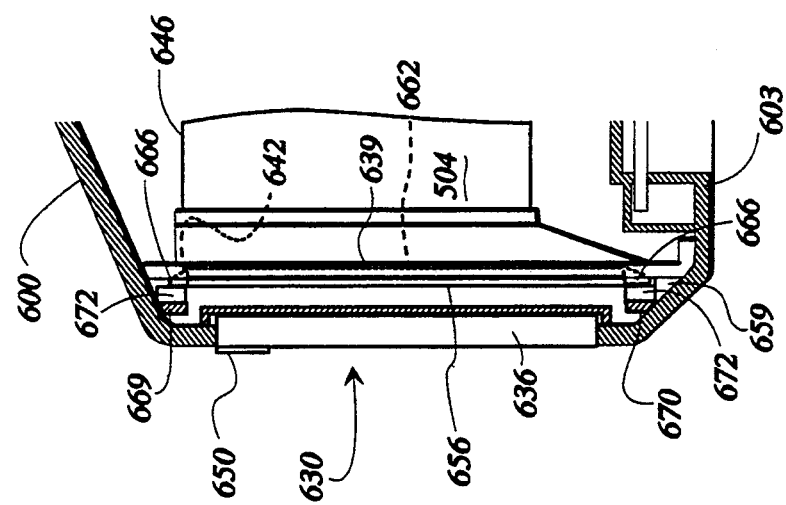
FIG. 23C is a partial side elevation view of the fan housing of the metal-air power supply shown in FIG. 14 with the switch in the "off" position.
Figure 23A:
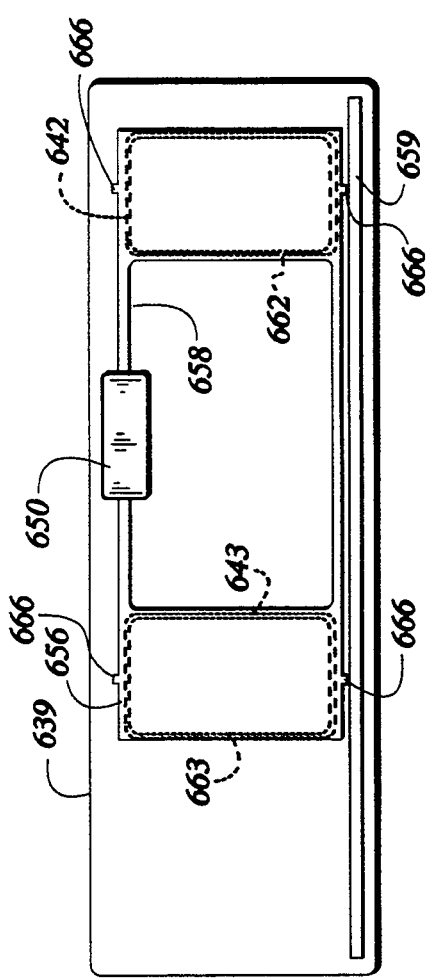
FIG. 23A is a partial frontal elevation view of the fan housing of the metal-air power supply shown in FIG. 14 with the switch in the "off" position.
Figure 23B:
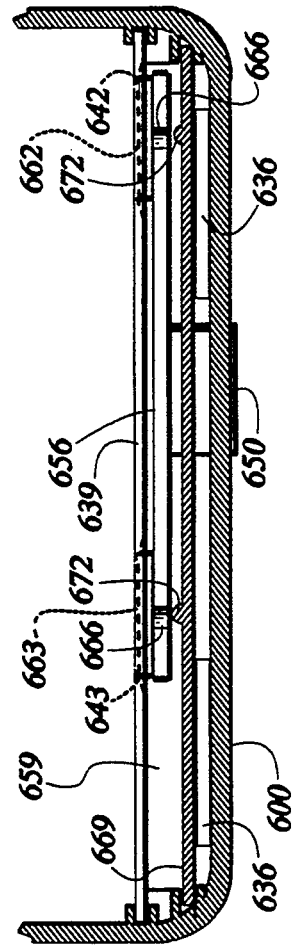
FIG. 23B is a partial plan view of the fan housing of the metal-air power supply shown in FIG. 14 with the switch in the "off" position.

A manual switch 650 is positioned between the air intake and exhaust opening 630 and 633 and reciprocates between an "on" position, and "off" position, and a "recharge" position similar to the switch mechanism of the previously described embodiment 10. The switch 650 connects to a rectangular door slide 656 through an opening 653. The door slide fits between the air intake and exhaust opening 630 and 633 and the baffle plate 639. The door slide is supported by a ledge 659 extending from the baffle plate. The door slide 656 reciprocates across the baffle plate 639 in response to manual movement of the switch 650. Rectangular blocks 652 and 653 at each end of the door slide 656 fit into the inlet and outlet openings 642 and 643 when the door slide is properly positioned as shown in FIGS. 23a, 23b and 23c.

Tabs 666 extend from the top and bottom edges of the door slide 656 and operate with cams 669 and 670 extending from the top and bottom of the fan housing 508 to shift the door slide 656 into the "off" position. Protrusion 672 extending from the cams 669 and 670 push the door slide 656 towards the baffle plate 639 when the tab 666 and protrusion 672 are aligned as shown in FIGS. 23a, 23b and 23c. In the "on" and "recharge" positions shown in FIGS. 22A, 22B 22C, 24A, 24B, and 24C, the tabs 666 and protrusion 672 are not aligned and the door slide 656 is not pushed forward into the baffle plate 639.

Figure 21:
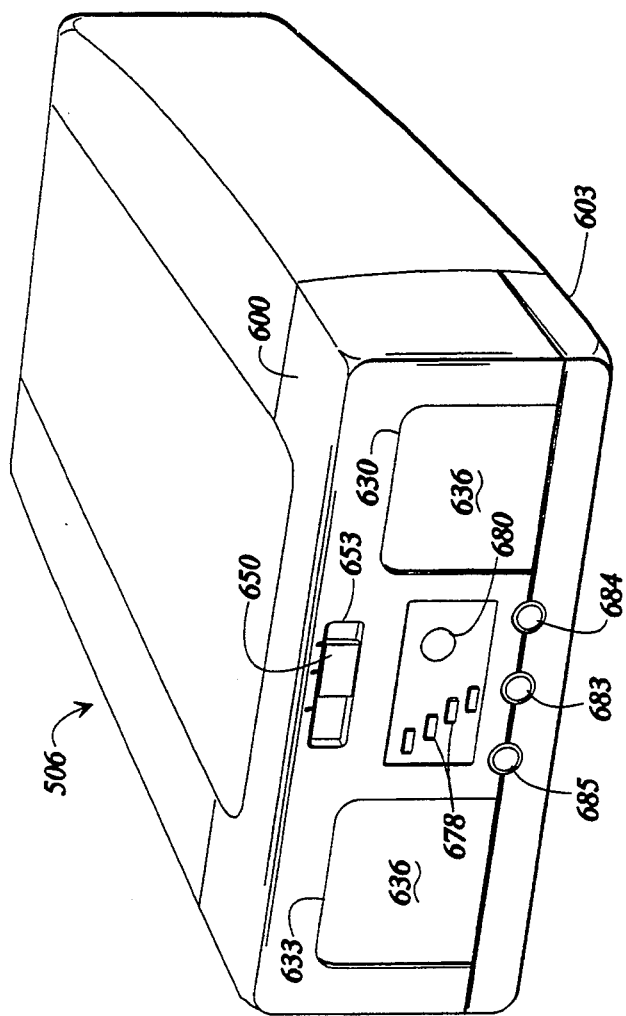
FIG. 21 is a frontal perspective view of the metal-air power supply shown in FIG. 14.
Figure 20:
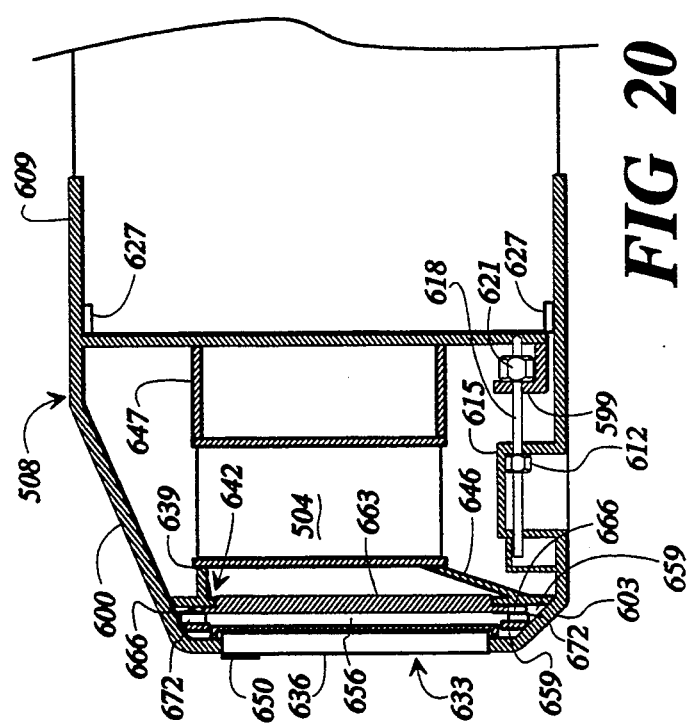
FIG. 20 is a partial side elevation view of the fan housing of the metal-air power supply shown in FIG. 14.

The electronics package 606 can be the same as the electronics package used in the power supply 10 shown in FIGS. 1-5. As shown in FIG. 21, the power supply 500 preferably includes a charge level indicator display 678 and a charge level indicator on-off switch 680 similar to that described in accordance with the first embodiment 10. In addition, the power supply 500 includes a recharger jack 683 for use with 110 volt AC power. Also, the power supply 500 includes a 12-volt DC power out jack 685 for use with the above-disclosed embodiment and also includes a 9-volt DC power out jack 684 when a 9-cell battery pack is used. As explained hereinabove, the present invention is not limited to any number of metal-air cells or any particular voltage output. The present invention may incorporate any number of metal-air cells to produce the desired voltage output.

To operate the power supply 500, the switch 650 is turned to the "on" position thereby opening the intake and exhaust openings 630 and 633 and turning on the fan 504. As can be seen from FIGS. 22A, 22B and 22C, when the switch 650 is in the "on" position, the inlet and outlet openings 642 and 643 of the baffle plate 639 are not obstructed by the door slide 656. In response to turning the switch 650 "on," the fan pulls air into the intake plenum 587 through the intake opening 630. The air flows through the intake plenum 587 and then separates into a reactant air flow which flows through the reactant air inlets 563 into the cathode plenums 550, over the cathodes, out of the cathode plenums through the reactant air outlets 565, and into the exhaust plenum 590. The cooling air portion of the air flow flows through the cooling air inlets 568, through the cooling air plenums 555, and through the cooling air outlets 570 into the exhaust plenum 590 where the cooling air flow is recombined with the reactant air flow. The combined air flow then flows through the exhaust plenum 590 and out of the housing 506 through the exhaust opening 633.

The inlet and outlet sides 519 and 520 of the battery pack 503 serve as barriers which limit the volumetric flow rates of the reactant and cooling air flows. The reaction air outlets 565 are sized so as to limit the reactant portion of the air flow supplied by the fan 127 to a volumetric flow rate sufficient to produce a predetermined level of current from each cell 400 with minimal evaporation of water from the cells through the air cathodes. It should be understood that the reactant air inlets 563, instead of the reactant air outlets, could also be used to control the flow rate of the reactant portion of air flow. For the 12-volt battery pack 503 disclosed herein, the predetermined level of current from each cell 400 is preferably 1.25 amps per cell with a voltage of about 1 volt per cell with current spikes to 2.0 A at 1.0 V per cell. In addition, for the 12-volt embodiment, the diameter of the reactant air outlets 565 is preferably about 0.060 inches. The reactant air outlets 565 preferably limit the first portion of the air flow to a volumetric flow rate sufficient to provide 3 to 10 times the stoichiometric amount of oxygen necessary to produce the predetermined level of current from the cells 400. More preferably, the reactant portion of the air flow is limited to a volumetric flow rate sufficient to provide 4 to 5 times stoichiometric amount of oxygen. In the 12-volt embodiment utilizing zinc air battery cells, with a diameter of the reactant air outlets 565 being about 0.080 inches, the flow rate of the reactant portion of the air flow is about 1 liter per minute. As with the previously described power supply 10, if a higher level of current is desired, the air flow rate should be higher.

The fan 504 preferably produces a total volumetric flow rate of air sufficient so that the cooling air portion of the air flow has a volumetric flow rate sufficient to maintain the cells 400 below a temperature less than about 20° F. above ambient temperature. The cells 400 are preferably kept below about 90° F. Preferably, the total volumetric flow rate of air is sufficient so that the cooling air portion of the air flow has a volumetric flow rate is from about 10 to about 1,000 times the volumetric flow rate of the reactant air flow. The fan 504 for the 12-volt embodiment 500 is preferably a model MDA120420M fan available from INDEK Corporation in San Jose, Calif. This fan delivers 6 CFM and operates on ¼ watts of power.

During periods of nonuse of the power supply, the switch 650 is turned to the "off" position which closes the intake and exhaust openings 630 and 633 to seal the metal-air cells 400 from the outside air. As explained above, when the switch 650 is in the "off" position as shown in FIGS. 23A, 23B and 23C, the door slide 656 fits over the inlet and outlet openings 642 and 643 in the baffle plate 639 to seal the power supply 500.

Because this embodiment 500 of the present invention includes the electronics package disclosed hereinabove for the other preferred embodiment 10, this embodiment is also rechargeable. In the "recharge" position, the door slide 656 is positioned so that the blocks 662 and 663 of the door slide are slightly offset from the inlet and outlet openings 642 and 643 of the baffle plate 639 to allow some free flow of air through the power supply 500 during recharge.

It should be understood that the foregoing relates only to a preferred embodiment of the present invention, and that numerous changes may be made therein without departing from the spirit and scope of the invention as defined by the following claims.

We claim:

1. A metal-air power supply comprising:
   a housing;
   a metal-air cell disposed in the housing, the metal-air cell having an air cathode;
   means for producing a flow of air through the housing;
   means for directing a reactant portion of the air flow through a reactant air inlet to the air cathode and for exhausting the reactant portion of the air flow from the cell;
   means for directing a cooling air portion of the air flow through a cooling air inlet to a portion of the cell isolated from the air cathode, isolating the cooling air portion from the air cathode and the reactant portion, and exhausting the cooling portion of the air flow from the housing, the reactant air inlet and the cooling air inlet being separate from one another and isolated from the exhausted reactant and cooling portions of the air flow;
   means for limiting the reactant air flow to a volumetric flow rate sufficient to provide from about 3 to about 10 times the stoichiometric amount of oxygen necessary to produce a predetermined level of current from the cell, the air flow producing means producing a total volumetric flow rate sufficient so that the cooling portion of the air flow has a volumetric flow rate from about 10 to about 1000 times the volumetric flow rate of the reactant portion of the air flow.

2. A metal-air power supply as in claim 1 wherein the means for limiting the volumetric flow rate of the reactant portion of the air flow comprises a barrier having an orifice through which the reactant portion of the air flow passes, the orifice being sized so as to limit the volumetric flow rate of the reactant portion of the air flow.

3. A metal-air power supply as in claim 1 further comprising means for selectively exposing the air cathode to the reactant portion of the air flow, and alternatively isolating the air cathode from the reactant portion of the air flow.

4. A metal-air power supply comprising:
   a housing;
   means for producing a flow of air through the housing;
   a metal-air cell disposed within the housing, the cell including an air cathode disposed in a cell case;
   a cathode plenum adjacent the cathode, the cathode plenum having a cathode plenum inlet along one end of the cell and a cathode plenum outlet along the one end of the cell;
   a reactant air inlet plenum adjacent the one end of the cell for directing a reactant portion of the air flow through the cathode plenum inlet into the cathode plenum;
   a reactant air outlet plenum adjacent the reactant air inlet plenum, the reactant air inlet plenum being between the reactant air outlet plenum and the cell; and
   a duct extending across the reactant air inlet plenum from the cathode plenum outlet to the reactant air outlet plenum for defining a discrete path for directing the reactant portion of the air flow from the cathode plenum, through the cathode plenum outlet, across the reactant air inlet plenum, and into the reactant air outlet plenum, whereby the reactant portion of the air flow exits the cathode plenum without mixing with the reactant portion of the air flow entering the cathode plenum.

5. A metal-air power supply as in claim 4 further comprising means for directing a cooling portion of the air flow adjacent a portion of the cell case isolated from the cathode and isolating the cooling air portion from the air cathode and the reactant portion.

6. A metal-air power supply as in claim 4 further comprising:
   an air intake plenum adjacent the cell for receiving the flow of air, the reactant air inlet plenum extending from the air intake plenum and receiving the reactant portion of the air flow from the intake plenum; and
   means for directing a cooling portion of the air flow from the intake plenum, along a path adjacent a portion of the cell isolated from the cathode, and out of the housing, whereby the cooling portion of the air flow does not contact the cathode and is isolated from the air cathode and the reactant portion.

7. A metal-air power supply comprising:
   a housing;
   means for producing a flow of air through the housing;
   a metal-air cell disposed within the housing, the cell including an air cathode disposed in a cell case;
   a cathode plenum adjacent the cathode, the cathode plenum having a cathode plenum inlet along one end of the cell and a cathode plenum outlet along the one end of the cell;
   a reactant air inlet plenum adjacent the one end of the cell and a reactant air inlet plenum inlet opening for receiving the reactant portion of the air flow into the reactant air inlet plenum, the reactant air inlet plenum directing a reactant portion of the air flow through the cathode plenum inlet into the cathode plenum;
   a reactant air outlet plenum adjacent the reactant air inlet plenum and a reactant air outlet plenum outlet opening for discharging the reactant portion of the air flow, the reactant air inlet plenum being between the reactant air outlet plenum and the cell;
   a duct extending across the reactant air inlet plenum from the cathode plenum outlet to the reactant air outlet plenum for defining a discrete path for directing the reactant portion of the air flow from the cathode plenum, through the cathode plenum outlet, across the reactant air inlet plenum, and into the reactant air outlet plenum, whereby the reactant portion of the air flow exits the cathode plenum without mixing with the reactant portion of the air flow entering the cathode plenum;
   a door for closing both the reactant air inlet plenum inlet opening and the reactant air outlet plenum outlet opening; and means for selectively moving the door to one position wherein the reactant inlet plenum inlet opening and the reactant air outlet plenum outlet opening are open and, alternatively, moving the door to another position, wherein the reactant air outlet plenum inlet opening and reactant air outlet plenum outlet opening are closed.

8. A metal-air power supply as in claim 7 wherein the reactant air inlet plenum inlet opening and the reactant air outlet plenum outlet opening are aligned with one another.

9. A metal-air power supply as in claim 7 further comprising:
an air intake plenum adjacent the cell for receiving the flow of air, the reactant air inlet plenum extending from the air intake plenum and receiving the reactant portion of the air flow from the intake plenum when the door is in the open position; and wherein:
the door includes means for guiding the reactant portion of the air flow from the intake plenum into the reactant air inlet plenum.

10. A metal-air power supply as in claim 9 wherein the door includes a cover plate which closes the reactant air inlet plenum inlet opening and the reactant air outlet plenum outlet opening when the door is in the closed position and the guiding means includes a U-shaped member extending from the cover plate at least partially into the reactant air inlet plenum through the reactant air inlet plenum inlet opening.

11. A metal-air power supply as in claim 10 further comprising means for directing a cooling portion of the air flow from the intake plenum, along a path adjacent a portion of the cell isolated from the cathode, and out of the housing, whereby the cooling portion of the air flow does not contact the cathode.

12. A metal-air power supply comprising:
a metal-air cell including a case and an air cathode assembly disposed in the case, the air cathode being at least partially exposed to reactant air through one side of the case;
a cathode plenum adjacent the air cathode, the cathode plenum extending from a reactant air inlet proximate one end of the case to a reactant air outlet proximate an opposite end of the case;
a cooling air plenum adjacent a side of the case opposite the one side of the case, the cooling air plenum being discrete from the cathode plenum and extending from a cooling air inlet proximate the one end of the case to a cooling air outlet proximate the opposite end of the case;
a housing comprising:
a cell compartment in which the metal-air cell is disposed;
an air intake plenum adjacent the one end of the case, the air intake plenum having an air intake opening and surrounding the reactant air and cooling air inlets so as to isolate the reactant air and cooling air inlets from the reactant air and cooling air outlets; and
an air exhaust plenum adjacent the opposite end of the case and discrete from the air intake plenum, the air exhaust plenum having an air exhaust opening and surrounding the reactant air and cooling air outlets;
means for producing a flow of air which flows from the air intake opening through the air intake plenum, separates into a reactant air flow which flows through the cathode plenum from the reactant air inlet to the reactant air outlet and a cooling air flow which flows through the cooling air plenum from the cooling air inlet to the cooling air outlet, recombines into a single flow of air in the air exhaust plenum, and then flows through the air exhaust plenum and outside the housing through the air exhaust opening; and
means for selectively opening the air intake and air exhaust openings to expose the air cathode to the flow of air, and, alternatively, closing the air intake and air exhaust openings to isolate the air cathode from air outside the housing.

13. A metal-air power supply as in claim 12 wherein the cathode plenum and the cooling air plenum include;
a compartment for receiving the cell; and
means for registering the cell within the compartment so that when the cell is received within the compartment, the cell and the compartment form the cathode plenum and the cooling plenum in the compartment.

14. A metal-air power supply as in claim 13 wherein:
the compartment includes partitions spaced from one another for receiving the cell case between the partitions, a first panel extending between the partitions for forming at least a portion of the cathode plenum, and a second panel extending between the partitions spaced from the first panel for forming at least a portion of the cooling air plenum; and
the registering means includes a plurality of spaced ribs protruding from the first panel for spacing the cell case and air cathode from the first panel and a plurality of spaced ribs protruding from the second panel for spacing the cell case from the second panel.

15. A metal-air power supply as in claim 14 wherein:
the first panel has an interior surface facing the one side of the case, the interior surface having a recessed portion proximate the reactant air inlet and another recessed portion proximate the reactant air outlet, and the cathode plenum has a periphery; and further comprising:
a first barrier strip adhered to the interior surface and extending along the interior surface over the one recessed portion, the first barrier strip having a width, the one recessed portion extending beyond the width of the first barrier strip to form an air flow passage between the first barrier strip and the first panel;
a second barrier strip adhered to the interior surface and extending along the interior surface over the other recessed portion, the second barrier strip having a width, the other recessed portion extending beyond the width of the second barrier strip to form an air flow passage between the second barrier strip and the first panel; and
a band of sealant material extending substantially along the periphery of the cathode plenum and fitting sealingly between the case and the compartment, the band extending along the first and second barrier strips without blocking the air flow passage between the first and second barrier strips and the first panel,
whereby reactant air flow enters the cathode plenum through the air flow passageway between the first barrier and the first panel and exits the cathode plenum through the air flow passageway between the second barrier and the first panel.

16. A metal-air power supply comprising:
a metal-air cell having an air cathode, electrolyte, and an anode disposed in a cell case:
a compartment for receiving the cell; and
means for registering the cell within the compartment so that when the cell is received within the compartment, the cell case and the compartment form a cathode plenum in the compartment adjacent the air cathode and a cooling air plenum in the compartment isolated from the air cathode,
whereby reactant air may be directed adjacent the air cathode and cooling air may be directed against a portion of the cell case isolated from the air cathode.

17. A metal-air power supply as in claim 16 wherein:
the compartment includes partitions spaced from one another for receiving the cell case between the partitions, a first panel extending between the partitions for forming at least a portion of the cathode plenum, and a second panel extending between the partitions spaced from the first panel for forming at least a portion of the cooling air plenum; and
the registering means includes a plurality of spaced ribs protruding from the first panel for spacing the cell case and air cathode from the first panel and a plurality of spaced ribs protruding from the second panel for spacing the cell case from the second panel.

18. A metal-air power supply as in claim 17 wherein:
the cathode plenum has a reactant air inlet, a reactant air outlet and a periphery;
the air cathode is at least partially exposed to reactant air through one side of the case;
the first panel has an interior surface facing the one side of the case, the interior surface having a recessed portion proximate the reactant air inlet and another recessed portion proximate the reactant air outlet; and further comprising:
a first barrier strip adhered to the interior surface and extending along the interior surface across the one recessed portion, the first barrier strip having a width, the one recessed portion extending beyond the width of the first barrier strip to form an air flow passage between the first barrier strip and the first panel;
a second barrier strip adhered to the interior surface and extending along the interior surface across the other recessed portion; the second barrier strip having a width, the other recessed portion extending beyond the width of the second barrier strip to form an air flow passage between the second barrier strip and the first panel; and
a band of sealant material extending substantially along the periphery of the cathode plenum and fitting sealingly between the case and the compartment, the band extending along the first and second barrier strips without blocking the air flow passages between the first and second barrier strips and the first panel,
whereby reactant air flow enters the cathode plenum through the air flow passageway between the first barrier and the first panel and exits the cathode plenum through the air flow passageway between the second barrier strip and the first panel.

19. A metal-air power supply comprising:
a plurality of metal-air cells each having an exposed air cathode disposed in a respective cell case;
a plurality of trays stacked one upon another to form an array of compartments for receiving the cells;
means for registering the cells within the formed compartments so that the cell cases and the trays form a cathode plenum in each formed compartment adjacent the respective air cathode and a cooling air plenum in each formed compartment isolated from the respective air cathode,
whereby reactant air may be directed adjacent the air cathodes and cooling air may be directed against a portion of each cell case isolated from the air cathodes.

20. A metal-air power supply as in claim 19 wherein:
each tray includes partitions spaced from one another and a panel extending between the partitions, the cell cases being received between adjacent partitions, the panels forming at least a portion of each cathode plenum and at least a portion of each cooling air plenum, each panel having a first side and a second side; and
the registering means includes a plurality of spaced ribs protruding from both the first and second sides of the panels so that the ribs protruding from the first sides of the panels spaces the first sides of the panels from the cell cases and the respective air cathodes and the ribs protruding from the second sides of the panels spaces the second sides of the panels from the cell cases.

21. A metal-air power supply as in claim 20 wherein the partitions each include means for aligning the trays with one another.

22. A metal-air power supply as in claim 21 wherein:
the cathode plenums each have a reactant air inlet, a reactant air outlet and a periphery;
each air cathode is at least partially exposed to reactant air through one side of the respective cell case;
the first sides of the panels face the one sides of the respective cell cases, the first sides having a recessed portion proximate each reactant air inlet and another recessed portion proximate each reactant air outlet; and further comprising:
a plurality of first barrier strips adhered to the first sides of the panels and extending along the first sides of the panels across the one recessed portions, the first barrier strips having a width, each of the one recessed portions extending beyond the width of the respective first barrier strips to form an air flow passage between each first barrier strip and the respective first panel;
a plurality of second barrier strips adhered to the first sides of the panels and extending along the first sides of the panels across the other recessed portions, the second barrier strips having a width, each of the other recessed portions extending beyond the width of the respective second barrier strip to form an air flow passage between each second barrier strip and the respective first panel; and
a band of sealant material extending substantially along the periphery of each cathode plenum and fitting sealingly between the respective case and tray, each band extending along the respective first and second barrier strip without blocking the air flow passages between the respective first and second barrier strips and the first panels,
whereby reactant air flow enters the cathode plenums through the air flow passageways between the first barrier strips and the first panels and exits the cathode plenums through the air flow passageways between the second barrier strips and the first panels.

23. A metal-air cell comprising:
a case including a first member having an outer peripheral edge and a second member having an outer peripheral edge contiguous with the outer peripheral edge of the first member;
an anode disposed within the case adjacent the first member;
a substantially planar air cathode disposed within the case, the air cathode having an air side and an electrolyte side, the air side of the cathode being positioned adjacent the second member;
an electrolyte solution disposed within the case between the anode and the electrolyte side of the air cathode;
a first gas-permeable, liquid-impermeable membrane disposed within the case between the second member and the air side of the air-cathode, the first membrane covering the air side of the air-cathode and having an outer periphery extending beyond the air side of the air-cathode, the outer periphery of the first membrane extending proximate to the contiguous peripheral edges;
the first member, the second member, and the outer periphery of the first membrane being joined together along the contiguous outer peripheral edges of the first and second members to form a single, integral, liquid-impermeable seal about the case, whereby the anode, air-cathode, and electrolyte are completely encapsulated within a liquid impermeable enclosure.

24. A metal-air cell as in claim 23, wherein the first member, the second member, and the first membrane each comprise polymeric material and are heat welded to form the seal.

25. A metal-air as in claim 24, wherein the first member, the second member, and the first membrane each comprise polypropylene.

26. A metal-air cell as in claim 23, wherein the first member has an opening covered with a second liquid-impermeable, gas-permeable membrane for releasing gas from the liquid-impermeable enclosure.

27. A metal-air cell as in claim 23, wherein the second member includes a grid positioned adjacent at least a portion of the membrane-covered air-cathode, the grid of the second member having an open portion for exposing the first membrane to air.

28. A metal-air cell as in claim 27, further comprising support means including a peripheral side wall extending substantially perpendicularly from the first member to the grid of the second member for supporting the first membrane.

29. A metal-air cell as in claim 28, wherein the second member further includes a peripheral side wall extending substantially perpendicularly from the grid of the second member to the peripheral edge of the second member, the outer periphery of the first membrane extending between the peripheral side wall of the second member and the peripheral side wall of the supports means.

30. A metal air cell as in claim 23, further comprising support means including a peripheral side wall extending substantially perpendicularly from the first member to the grid of the second member for supporting the first membrane.

31. A metal-air cell as in claim 30, wherein the support means extends proximate to the contiguous peripheral edges, the first membrane extends between the case and support means, and the support means is also joined to the first membrane and the case along the seal.

32. A metal-air cell as in claim 31, wherein the first member, the second member, the first membrane and the support means each comprise polymeric material and are heat welded to form the seal.

33. A metal-air cell as in claim 32, wherein the first member, the second member, the first membrane, and the support means each comprise polypropylene.

* * * * *